United States Patent
Ling

(10) Patent No.: US 12,028,845 B2
(45) Date of Patent: Jul. 2, 2024

(54) BEAM CORRESPONDENCE CAPABILITY REPORTING METHOD AND APPARATUS

(71) Applicant: Huawei Technologies Co., Ltd., Shenzhen (CN)

(72) Inventor: Cen Ling, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 433 days.

(21) Appl. No.: 17/605,816

(22) PCT Filed: Apr. 17, 2020

(86) PCT No.: PCT/CN2020/085259
§ 371 (c)(1),
(2) Date: Oct. 22, 2021

(87) PCT Pub. No.: WO2020/216136
PCT Pub. Date: Oct. 29, 2020

(65) Prior Publication Data
US 2022/0210780 A1 Jun. 30, 2022

(30) Foreign Application Priority Data

Apr. 24, 2019 (CN) .......................... 201910336113.1
Jul. 31, 2019 (CN) .......................... 201910702752.5

(51) Int. Cl.
*H04W 8/00* (2009.01)
*H04W 8/22* (2009.01)
(Continued)

(52) U.S. Cl.
CPC ........... *H04W 72/046* (2013.01); *H04W 8/22* (2013.01); *H04W 24/10* (2013.01); *H04W 48/16* (2013.01)

(58) Field of Classification Search
None
See application file for complete search history.

(56) References Cited

U.S. PATENT DOCUMENTS

| | | |
|---|---|---|
| 2018/0102827 A1 | 4/2018 | Noh et al. |
| 2018/0227035 A1 | 8/2018 | Cheng et al. |
| 2019/0356371 A1 | 11/2019 | Osawa et al. |

FOREIGN PATENT DOCUMENTS

| | | |
|---|---|---|
| CN | 109560839 A | 4/2019 |
| WO | 2018085709 A1 | 5/2018 |

(Continued)

OTHER PUBLICATIONS

LG Electronics et al., "Proposal on UE beam correspondence," 3GPP TSG RAN WG1 Meeting #95, Spokane, USA, Nov. 12-16, 2018, R1-1812551, 3 pages.
(Continued)

*Primary Examiner* — Abdelillah Elmejjarmi
(74) *Attorney, Agent, or Firm* — Conley Rose, P.C.

(57) ABSTRACT

A beam correspondence capability reporting method includes determining, by a terminal device based on first determining information and a first determining condition, whether the terminal device has a beam correspondence capability. When the terminal device has the beam correspondence capability and a beam strength of a downlink receive beam is not less than a first strength threshold, determining, by the terminal device, an uplink transmit beam using the beam correspondence capability. Transmitting, by the terminal device, first communication information using the uplink transmit beam, receiving, by the terminal device, n transmission requests for the first communication information, performing detaching, by the terminal device, and reporting, by the terminal device, first capability information in a process of re-accessing a base station, indicating that the terminal device does not have the beam correspondence capability.

20 Claims, 11 Drawing Sheets

(51) Int. Cl.
*H04W 24/10* (2009.01)
*H04W 48/16* (2009.01)
*H04W 72/044* (2023.01)

(56) References Cited

FOREIGN PATENT DOCUMENTS

| | | |
|---|---|---|
| WO | 2018147346 A1 | 8/2018 |
| WO | 2018202060 A1 | 11/2018 |
| WO | 2019062724 A1 | 4/2019 |
| WO | 2019064270 A1 | 4/2019 |

OTHER PUBLICATIONS

MediaTek Inc et al., "FR2 UE beam correspondence requirements," 3GPP TSG-RAN WG4 Meeting #86, Athens, Greece, Feb. 26-Mar. 2, 2018, R4-1802282, 4 pages.

Huawei et al., "On beam correspondence for FR2," 3GPP TSG-RAN WG4 Meeting #88, Gothenburg, Sweden, Aug. 20-24, 2018, R4-1811206, 2 pages.

Huawei, HiSilicon et al., "On beam correspondence for FR2," 3GPP TSG-RAN WG4 Meeting #88bis, Chengdu, China, Oct. 8-12, 2018, R4-1813478, 3 pages.

Zhiyuan Jiang et al., "A Novel TLS-Based Antenna Reciprocity Calibration Scheme in TDD MIMO Systems," IEEE Communications Letters, vol. 20, No. 9, Sep. 2016, 4 pages.

NTT DOCOMO,Inc., "Beam correspondence information (BCI) acquisition scheme," 3GPP TSG RAN WG1 Meeting #87, Reno, USA, Nov. 14-18, 2016, R1-1612732, 3 pages.

Samsung, "Discussion on beam correspondence," 3GPP TSG RAN WG1 #88, Athens, Greece, Feb. 13-17, 2017, R1-1702941, 4 pages.

MediaTek Inc., "Remaining Details on Beam Management," 3GPP TSG RAN WG1 Meeting NR Ad-Hoc #3,Nagoya, Japan, Sep. 18-21, 2017, R1-1716213, 7 pages.

3rd Generation Partnership Project; Technical Specification Group Radio Access Network; Study on New Radio Access Technology, Physical Layer Aspects, 3GPP TR 38.802 V14.2.0, Sep. 2017, 134 pages.

R1-1700599, NTT DOCOMO, Inc., "Definition of beam correspondence and beam correspondence determination mechanism," 3GPP TSG-RAN WG1-NR Spokane, USA, Jan. 16-20, 2017, 3 pages.

BEAM CORRESPONDENCE CAPABILITY REPORTING METHOD AND APPARATUS

CROSS-REFERENCE TO RELATED APPLICATIONS

This application is a U.S. National Stage of International Patent Application No. PCT/CN2020/085259 filed on Apr. 17, 2020, which claims priority to Chinese Patent Application No. 201910702752.5 filed on Jul. 31, 2019 and Chinese Patent Application No. 201910336113.1 filed on Apr. 24, 2019. All of the aforementioned patent applications are hereby incorporated by reference in their entireties.

TECHNICAL FIELD

This application relates to the field of communications technologies, and specifically, to a beam correspondence capability reporting method and apparatus.

BACKGROUND

In a fifth-generation (fifth-generation, 5G) communications technology, a spectrum resource of a high frequency band is usually used. However, path attenuation of a high frequency band is relatively large. To resolve large path attenuation, currently, an antenna array is usually configured for a base station and a terminal device that use the 5G communications technology, so that the base station and the terminal device use a beamforming (Beamforming, BF) technology. The beamforming technology can trigger an array gain, thereby effectively increasing information coverage and resolving path attenuation of a high frequency band. When the beamforming technology is used, a plurality of beams with different directions can be used on both a base station side and a terminal device side for communication.

In addition, because each beam has relatively strong directivity and the beam is relatively narrow, to implement efficient communication between the base station and the terminal device, an appropriate transmit-receive beam pair needs to be selected for the base station and the terminal device. Each time the terminal device accesses the base station, the terminal device may perform beam management with the base station, and determine an appropriate transmit-receive beam pair through beam management, so as to perform communication by using the appropriate transmit-receive beam pair. This improves communication quality. However, the beam management is relatively cumbersome and takes a period of time. In this case, a concept of beam correspondence (beam correspondence, BC) is introduced into the 5G communications technology. The base station and the terminal device can determine an appropriate transmit-receive beam pair by using respective beam correspondence capabilities.

However, in a research process of this application, the inventor finds that the beam correspondence capability of the terminal device changes. In some application scenarios, the terminal device does not have the beam correspondence capability, in other words, a transmit-receive beam pair previously determined by the terminal device by using the beam correspondence capability is usually not appropriate. However, in this case, the terminal device usually continues to transmit information by using the transmit-receive beam pair, and therefore a beam used by the terminal device deviates from the base station. Consequently, communication efficiency is reduced, and even the base station cannot receive, when a beam deviation angle is relatively large, the information transmitted by the terminal device. As a result, a communication service cannot be performed.

SUMMARY

When a terminal device does not have a beam correspondence capability, if the terminal device still transmits information by using a receive beam and a transmit beam that are determined by using the beam correspondence capability, communication efficiency is reduced, and even a base station cannot receive the information transmitted by the terminal device. To resolve this problem, embodiments of this application disclose a beam correspondence capability reporting method and apparatus.

According to a first aspect, an embodiment of this application discloses a beam correspondence capability reporting method, including:

A terminal device determines, based on pre-obtained first determining information and a first determining condition, whether the terminal device has a beam correspondence capability.

When the terminal device determines that the terminal device has the beam correspondence capability, and a beam strength of a downlink receive beam of the terminal device is not less than a preset first strength threshold, the terminal device determines, by using a preset beam correspondence capability, an uplink transmit beam corresponding to the downlink receive beam.

The terminal device transmits first communication information by using the uplink transmit beam.

When the terminal device receives n transmission requests for the first communication information, the terminal device performs detaching, where n is a preset positive integer greater than 1.

The terminal device reports first capability information in a process of re-accessing a base station, where the first capability information indicates that the terminal device does not have the beam correspondence capability.

According to the foregoing beam correspondence capability reporting method, the beam correspondence capability of the terminal device may be measured, and reporting is performed when it is determined that the terminal device does not have the beam correspondence capability. This avoids a case in which communication efficiency is reduced because the terminal device still transmits information by using an inappropriate transmit-receive beam pair when the terminal device does not have the beam correspondence capability.

In an optional design, the first determining information includes an environment parameter threshold and/or a cell ID set.

An environment parameter is at least one of a temperature or humidity.

In an optional design, when the first determining information includes the environment parameter threshold, the method further includes:

When the terminal device receives the n transmission requests for the first communication information, the terminal device obtains at least one environment parameter.

When the at least one environment parameter is not less than a first parameter threshold, the terminal device determines the environment parameter threshold based on the at least one environment parameter and a historical environment parameter that is not less than the first parameter threshold.

According to the foregoing steps, when the terminal device does not have the beam correspondence capability, the terminal device may update the environment parameter threshold based on the at least one obtained environment parameter.

In an optional design, the method further includes:

When the terminal device receives the n transmission requests for the first communication information, the terminal device obtains a signal to interference plus noise ratio SINR of the downlink receive beam.

When the SINR is greater than a preset second parameter threshold, the terminal device adds a cell ID of a currently accessed cell to the cell ID set.

According to the foregoing steps, the terminal device may obtain a cell ID of a cell accessed by the terminal device when the terminal device does not have the beam correspondence capability because of interference from a neighboring cell, and add the cell ID to the cell ID set, where the cell ID set belongs to the first determining information, so as to subsequently determine, based on the obtained cell ID set, whether the terminal device has the beam correspondence capability.

In an optional design, when the first determining information includes the environment parameter threshold, that a terminal device determines, based on pre-obtained first determining information and a first determining condition, whether the terminal device has a beam correspondence capability includes:

If a current environment parameter is not less than the environment parameter threshold,
 the terminal device determines that the terminal device does not have the beam correspondence capability.

According to the foregoing step, the terminal device may determine, based on an environment in which the terminal device is located, whether the terminal device has the beam correspondence capability.

In an optional design, when the first determining information is the cell ID set, that a terminal device determines, based on pre-obtained first determining information and a first determining condition, whether the terminal device has a beam correspondence capability includes:

When a cell ID of a cell currently to be accessed by the terminal device is the same as a cell ID included in the cell ID set, the terminal device determines that the terminal device does not have the beam correspondence capability.

According to the foregoing step, the terminal device may determine, based on the cell ID of the current to-be-accessed cell, whether the terminal device has the beam correspondence capability.

In an optional design, the method further includes:

When the current environment parameter is not less than the environment parameter threshold, the terminal device obtains a new environment parameter at an interval of a first period.

When the new environment parameter is less than a preset third parameter threshold, the terminal device performs detaching.

The terminal device reports second capability information in a process of re-accessing a base station, where the second capability information indicates that the terminal device has the beam correspondence capability.

According to the foregoing method, the terminal device may determine, based on the environment parameter, whether the terminal device restores the beam correspondence capability, and proactively report the second capability information after the restoration, so that the base station determines that the terminal device has the beam correspondence capability.

In an optional design, the method further includes:

When the cell ID of the current to-be-accessed cell is the same as a cell ID in the cell ID set, and when the terminal device accesses a new cell, the terminal device compares a cell ID of the new to-be-accessed cell with the cell ID set.

When the cell ID of the new to-be-accessed cell is different from each cell ID in the cell ID set, the terminal device performs detaching.

The terminal device reports second capability information in a process of re-accessing a base station, where the second capability information indicates that the terminal device has the beam correspondence capability.

According to the foregoing method, the terminal device may determine, based on the cell ID of the to-be-accessed cell, whether the terminal device restores the beam correspondence capability, and proactively report the second capability information after the restoration, so that the base station determines that the terminal device has the beam correspondence capability.

In an optional design, after the terminal device reports the first capability information, the method further includes:

The terminal device performs beam management to re-determine a transmit-receive beam pair.

According to the foregoing step, the terminal device may re-determine the transmit-receive beam pair through beam management, so that the terminal device communicates with the base station by using the re-determined transmit-receive beam pair. This ensures efficiency of communication between the terminal device and the base station.

In an optional design, the method further includes:

When an optimal downlink receive beam determined by the terminal device through beam management is the same as a first downlink receive beam, and an optimal uplink transmit beam determined by the terminal device through beam management is the same as a first uplink transmit beam, the terminal device performs detaching, where the first downlink receive beam is an optimal downlink receive beam determined by using the beam correspondence capability, and the first uplink transmit beam is an optimal uplink transmit beam determined by using the beam correspondence capability.

The terminal device reports second capability information in a process of re-accessing a base station, where the second capability information indicates that the terminal device has the beam correspondence capability.

According to the foregoing steps, the terminal device may determine, based on the transmit-receive beam pair determined through beam management, whether the terminal device restores the beam correspondence capability, and proactively report the second capability information after the restoration, so that the base station determines that the terminal device has the beam correspondence capability.

According to a second aspect, an embodiment of this application discloses a beam correspondence capability reporting apparatus, including:
 a first determining module, configured to determine, based on pre-obtained first determining information and a first determining condition, whether a terminal device has a beam correspondence capability;
 a beam determining module, configured to: when the first determining module determines that the terminal device has the beam correspondence capability, and a beam strength of a downlink receive beam of the terminal device is not less than a preset first strength threshold, determine, by using a preset beam correspondence capability, an uplink transmit beam corresponding to the downlink receive beam;

an information transmission module, configured to transmit first communication information by using the uplink transmit beam;
a detach module, configured to: when the terminal device receives n transmission requests for the first communication information, perform detaching, where n is a preset positive integer greater than 1; and
a capability reporting module, configured to report first capability information in a process in which the terminal device re-accesses a base station, where the first capability information indicates that the terminal device does not have the beam correspondence capability.

In an optional design, the first determining information includes an environment parameter threshold and/or a cell ID set.

An environment parameter is at least one of a temperature or humidity.

In an optional design, when the first determining information includes the environment parameter threshold, the apparatus further includes:
a first parameter obtaining module, configured to: when the terminal device receives the n transmission requests for the first communication information, obtain at least one environment parameter; and
a threshold determining module, configured to: when the at least one environment parameter is not less than a first parameter threshold, determine the environment parameter threshold based on the at least one environment parameter and a historical environment parameter that is not less than the first parameter threshold.

In an optional design, the apparatus further includes.
a SINR obtaining module, configured to: when the terminal device receives the n transmission requests for the first communication information, obtain a signal to interference plus noise ratio SINR of the downlink receive beam; and
a cell ID adding module, configured to: when the SINR is greater than a preset second parameter threshold, add a cell ID of a currently accessed cell to the cell ID set.

In an optional design, when the first determining information includes the environment parameter threshold, the first determining module is specifically configured to:
if a current environment parameter is not less than the environment parameter threshold, determine that the terminal device does not have the beam correspondence capability.

In an optional design, when the first determining information includes the cell ID set,
the first determining module is specifically configured to: when a cell ID of a cell currently to be accessed by the terminal device is the same as a cell ID included in the cell ID set, determine that the terminal device does not have the beam correspondence capability.

In an optional design, the apparatus further includes:
a second parameter obtaining module, configured to: when the current environment parameter is not less than the environment parameter threshold, obtain a new environment parameter at an interval of a first period.
The detach module is further configured to: when the new environment parameter is less than a preset third parameter threshold, perform detaching.
The capability reporting module is further configured to report second capability information in a process in which the terminal device re-accesses a base station, where the second capability information indicates that the terminal device has the beam correspondence capability.

In an optional design, the apparatus further includes:
a cell ID comparison module, configured to: when the cell ID of the current to-be-accessed cell is the same as a cell ID in the cell ID set, and when the terminal device accesses a new cell, compare a cell ID of the new to-be-accessed cell with the cell ID set.
The detach module is further configured to: when the cell ID of the new to-be-accessed cell is different from each cell ID in the cell ID set, perform detaching.
The capability reporting module is further configured to report second capability information in a process in which the terminal device re-accesses a base station, where the second capability information indicates that the terminal device has the beam correspondence capability.

In an optional design, the apparatus further includes.
a beam management module, configured to: after the terminal device reports the first capability information, perform beam management to re-determine a transmit-receive beam pair.

In an optional design, the detach module is further configured to: when an optimal downlink receive beam determined through beam management is the same as a first downlink receive beam, and an optimal uplink transmit beam determined through beam management is the same as a first uplink transmit beam, perform detaching, where the first downlink receive beam is an optimal downlink receive beam determined by using the beam correspondence capability, and the first uplink transmit beam is an optimal uplink transmit beam determined by using the beam correspondence capability.

The capability reporting module is further configured to report second capability information in a process of re-accessing a base station, where the second capability information indicates that the terminal device has the beam correspondence capability.

According to a third aspect, an embodiment of this application discloses a beam correspondence capability reporting apparatus, including:
a processor and a memory.
The memory is configured to store program instructions.
The processor is configured to invoke and execute the program instructions stored in the memory, so that the beam correspondence capability reporting apparatus performs the beam correspondence capability reporting method according to the first aspect.

In an optional design, the beam correspondence capability reporting apparatus is a chip.

According to a fourth aspect, an embodiment of this application discloses a computer-readable storage medium.
The computer-readable storage medium stores instructions, and when the instructions are run on a computer, the computer is enabled to perform the beam correspondence capability reporting method according to the first aspect.

According to the beam correspondence capability reporting method disclosed in the embodiments of this application, the beam correspondence capability of the terminal device may be measured, and reporting is performed when it is determined that the terminal device does not have the beam correspondence capability. This avoids a case in which communication efficiency is reduced because the terminal device still transmits information by using an inappropriate transmit-receive beam pair when the terminal device does not have the beam correspondence capability.

Further, in the embodiments of this application, the terminal device may determine, based on whether two factors, namely, the first determining information and the first communication information, are successfully sent, whether the terminal device has the beam correspondence capability, so that the terminal device can accurately determine whether the terminal device has the beam correspondence capability.

In addition, in the embodiments of this application, when the terminal device determines, by using the first determining information, that the terminal device does not have the beam correspondence capability, the terminal device does not need to determine, based on whether the first communication information is successfully sent, whether the terminal device has the beam correspondence capability. In other words, in the embodiments of this application, the terminal device first determines, by using the first determining information, whether the terminal device has the beam correspondence capability, and directly reports the first capability information when determining that the terminal device does not have the beam correspondence capability. This saves power consumption generated when the terminal device sends the first communication information. Moreover, when determining, based on whether the first communication information is successfully sent, whether the terminal device has the beam correspondence capability, the terminal device usually needs to send the first communication information for a plurality of times. This is relatively time-consuming. Therefore, a manner of preferably determining, by using the first determining information, whether the terminal device has the beam correspondence capability can also improve efficiency of determining, by the terminal device, whether the terminal device has the beam correspondence capability.

BRIEF DESCRIPTION OF DRAWINGS

To describe technical solutions in this application more clearly, the following briefly describes the accompanying drawings used for describing the embodiments. It is clearly that a person of ordinary skill in the art may derive other drawings from these accompanying drawings without creative efforts.

DESCRIPTION OF EMBODIMENTS

When a terminal device does not have a beam correspondence capability, if the terminal device still transmits information by using a receive beam and a transmit beam that are determined by using the beam correspondence capability, communication efficiency is reduced, and even a base station cannot receive the information transmitted by the terminal device. To resolve this problem, the embodiments of this application disclose a beam correspondence capability reporting method and apparatus.

Figure 1:
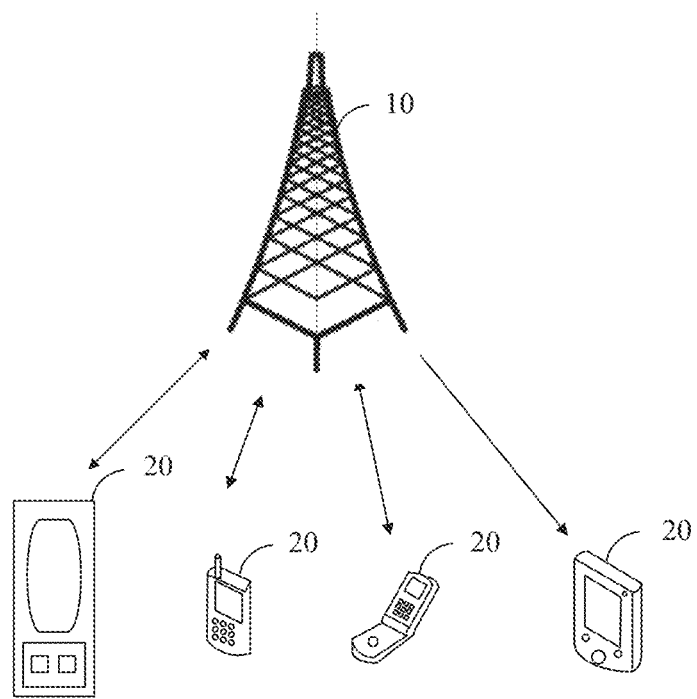
FIG. 1 is a schematic structural diagram of a communications system according to an embodiment of this application.

Referring to FIG. 1, an embodiment of this application is applied to a communications system. The communications system includes one base station 10 and a plurality of terminal devices 20. The base station 10 is provided with an information transmission reception point (transmission reception point TRP), and may communicate with the plurality of terminal devices 20 through the TRP. The base station 10 is a wireless network node, and can provide the terminal device 20 with a plurality of wireless communication services such as sending and receiving of a voice call, a video, and a message. In addition, the terminal device 20 may also be referred to as user equipment (user equipment, UE). The terminal device 20 may be a mobile terminal (for example, a smartphone), a vehicle-mounted device, an intelligent wearable device, or the like. This is not limited in this embodiment of this application. For example, in a 5G communications technology, the base station is a 5G base station, and correspondingly the terminal device is a 5G terminal device.

Figure 2:
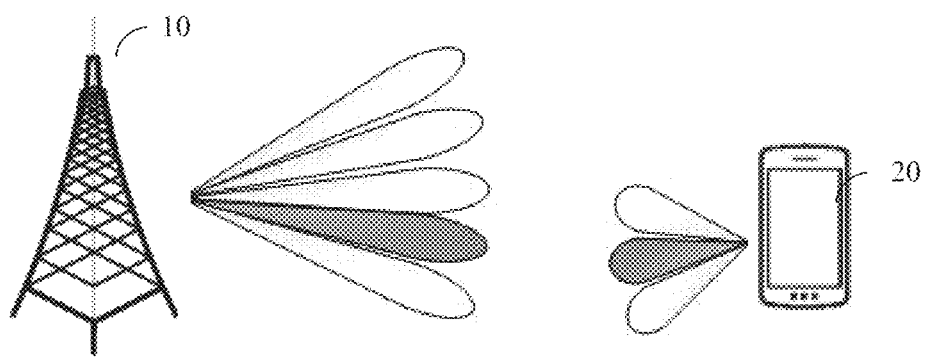
FIG. 2 is a schematic diagram of a beam in a beam correspondence capability reporting method according to an embodiment of this application.

In addition, referring to FIG. 2, in this embodiment of this application, the base station 10 and the terminal device can use a beamforming technology. In other words, an antenna array is configured for both the base station 10 and the terminal device 20. To resolve path attenuation, the base station 10 usually performs downlink transmission by using a plurality of narrow beams with different directions. Correspondingly, the terminal device 20 also has a plurality of narrow beams with different directions, and may perform uplink transmission by using the narrow beams.

In this case, because each beam has relatively strong directivity, to implement efficient communication between the base station and the terminal device, an appropriate transmit-receive beam pair needs to be configured.

Figure 3:
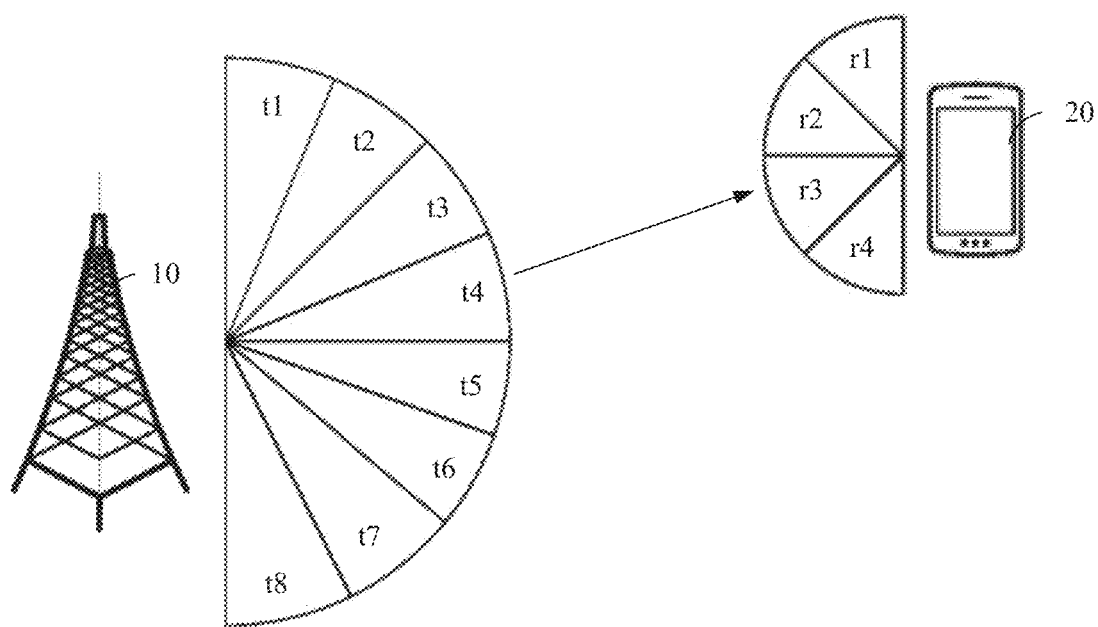
FIG. 3 is a schematic diagram of a beam in a beam correspondence capability reporting method according to an embodiment of this application.

To determine a transmit-receive beam pair used during communication between the base station and the terminal device, this application discloses an example. The example discloses a schematic diagram of a beam shown in FIG. 3. An antenna array is configured for both the base station 10 and the terminal device 20 in FIG. 3, and data may be transmitted on a frequency domain resource of a high frequency band by using a plurality of beams. As shown in FIG. 3, the base station 10 uses a total of eight beams t1 to t8. The eight beams are used as downlink transmit beams of the base station 10, and all are narrow beams. In other words, during downlink transmission, the base station 10 may transmit information to the terminal device 20 by using the eight beams. In addition, the terminal device 20 uses a total of four beams r1 to r4. The four beams are used as downlink receive beams of the terminal device 20. In other words, during downlink transmission, the terminal device 20 may receive, by using the four beams, the information transmitted by the base station 10.

In this case, to improve communication efficiency, the base station 10 may sequentially transmit information to the terminal device 20 by using downlink transmit beams with different directions (that is, the eight beams t1 to t8), so as to select, from the eight beams t1 to t8 as an optimal downlink transmit beam, a downlink transmit beam whose direction is most aligned with the terminal device 20. In addition, the terminal device may sequentially receive, by using downlink receive beams with different directions (that is, the four beams r1 to r4), a beam transmitted by the base station 10, so as to select, from the four beams r1 to r4 as an optimal downlink receive beam, a downlink receive beam whose direction is most aligned with the base station 10. When the base station 10 transmits information to the terminal device 20 by using the optimal downlink transmit beam, and the terminal device 20 receives, by using the optimal downlink receive beam, the information transmitted by the base station 10, communication efficiency of downlink communication is highest. The optimal downlink transmit beam and the optimal downlink receive beam may be used as an optimal transmit-receive beam pair during downlink communication. For example, when the optimal downlink transmit beam of the base station 10 for the terminal device 20 is t4, and the optimal downlink receive beam of the terminal device 20 for the base station 10 is r3, the optimal transmit-receive beam pair is (t4, r3).

Correspondingly, during uplink communication, both the base station 10 and the terminal device 20 have beams for performing uplink communication. The terminal device 20 may sequentially transmit information to the base station 10 by using uplink transmit beams with different directions, so as to determine that an uplink transmit beam whose direction is most aligned with the base station 10 is an optimal uplink transmit beam. In addition, the base station 10 may sequentially receive, by using uplink receive beams with different directions, the information transmitted by the terminal device 20, so as to determine that an uplink receive beam whose direction is most aligned with the terminal device 20 is an optimal uplink receive beam. When the terminal device transmits information to the base station by using the optimal uplink transmit beam, and the base station receives, by using the optimal uplink receive beam, the information transmitted by the terminal device, communication efficiency of uplink communication is highest. The optimal uplink transmit beam and the optimal uplink receive beam may be used as an optimal transmit-receive beam pair during uplink communication.

Figure 4:
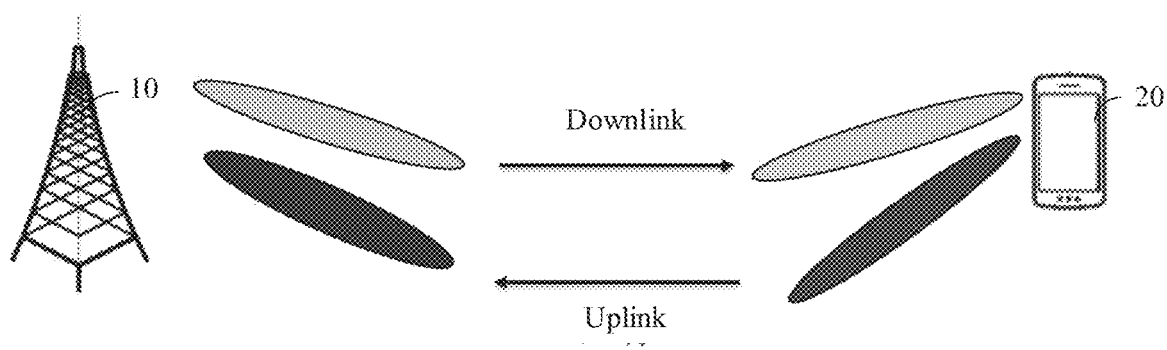
FIG. 4 is a schematic diagram of a beam correspondence capability in a beam correspondence capability reporting method according to an embodiment of this application.

In this case, to improve communication efficiency, a beam correspondence capability is usually configured for both the terminal device and the base station. Referring to a schematic diagram of a beam correspondence capability shown in FIG. 4, the beam correspondence capability of the base station means the following: (1) The base station can determine an optimal uplink receive beam for a terminal device based on an optimal downlink transmit beam for the terminal device, so as to receive, by using the optimal uplink receive beam, information transmitted by the terminal device. (2) The base station can determine an optimal downlink transmit beam for a terminal device based on an optimal uplink receive beam for the terminal device, so as to transmit information to the terminal device by using the optimal downlink transmit beam.

In addition, the beam correspondence capability of the terminal device means the following: (1) The terminal device can determine an optimal uplink transmit beam for a base station based on an optimal downlink receive beam for the base station, so as to transmit information to the base station by using the optimal uplink transmit beam. (2) The terminal device can determine an optimal downlink receive beam for the terminal device based on an optimal uplink transmit beam for a base station, so that the terminal device receives, by using the optimal downlink receive beam, information transmitted by the base station. [00%] When the terminal device has the beam correspondence capability, the terminal device usually determines a corresponding optimal uplink transmit beam based on a downlink receive beam used when the terminal device receives information sent by the base station. Specifically, after receiving, by using a downlink receive beam, information transmitted by the base station, the terminal device determines an optimal uplink transmit beam for the base station based on the downlink receive beam and the beam correspondence capability of the terminal device, and then transmits information to the base station by using the optimal uplink transmit beam.

Generally, the beam correspondence capability is configured for the terminal device when the terminal device is delivered from a factory. For example, a correspondence between each downlink receive beam and an optimal uplink transmit beam corresponding to the downlink receive beam and a correspondence between each uplink transmit beam and an optimal downlink receive beam corresponding to the uplink transmit beam may be set in the terminal device, so that the terminal device determines, by using the beam correspondence capability, a beam that needs to be used in a process in which the terminal device communicates with the base station.

The correspondences may be stored in a memory of the terminal device in a form of a table, a database, or the like; or a learning model may be set in the terminal device and the terminal device obtains the correspondences by using the learning model.

Certainly, the beam correspondence capability of the terminal device may alternatively be represented in another form. This is not limited in the embodiments of this application.

In addition, when the terminal device has the beam correspondence capability, the terminal device usually reports related information of the beam correspondence capability of the terminal device to the base station in a process of accessing the base station. After the reporting, in a process in which the terminal device communicates with the base station, the terminal device communicates with the base station by using a beam determined based on the beam correspondence capability.

For example, in a process in which a first terminal device communicates with a first base station, the first terminal device determines that an optimal downlink receive beam is a downlink receive beam a. In this case, the first terminal device may determine, by using a beam correspondence capability, an uplink transmit beam b corresponding to the downlink receive beam a, and transmit information to the first base station by using the uplink transmit beam b.

However, in an application process, the beam correspondence capability of the terminal device changes. For example, in some application scenarios, the terminal device does not have the beam correspondence capability. In this case, the beam determined by the terminal device by using the beam correspondence capability is not appropriate. If the terminal device continues to use the beam, the beam used by the terminal device deviates from the base station, and consequently communication efficiency is reduced. Further, if a determined uplink transmit beam deviates from the base station by a relatively large angle, the base station even cannot receive information transmitted by the terminal device, and consequently a communication service cannot be performed.

For example, in a first application scenario, the terminal device has the beam correspondence capability. In the process of communicating with the base station, the terminal device determines, by using the downlink receive beam a, that an optimal uplink transmit beam corresponding to the downlink receive beam a is the uplink transmit beam b, and transmits information to the base station by using the uplink transmit beam b. The uplink transmit beam b is a transmit beam aligned with the base station. In this way, the base station can receive the information transmitted by the terminal device.

In a second application scenario, the terminal device does not have the beam correspondence capability. In this case, if the terminal device still considers by default that the terminal device has the beam correspondence capability and receives, by using the downlink receive beam a, information transmitted by the base station, the terminal device still transmits information to the base station by using the uplink transmit beam b. However, in this application scenario, the uplink transmit beam b is usually not a beam aligned with a reference. When information is transmitted to the base station by using the uplink transmit beam b, communication efficiency is reduced, and even the base station cannot receive, when the uplink transmit beam b deviates from the base station by a relatively large angle, the information transmitted by using the uplink transmit beam b.

In addition, the terminal device does not have the beam correspondence capability usually because of a plurality of factors. Correspondingly, the second application scenario may include a plurality of application scenarios. It can be learned from proposals R1-1702941 and R1-1612732 that, in an application scenario of a high temperature or high humidity and an application scenario of cell interference, the terminal device usually does not have the beam correspondence capability. In addition, after an antenna disposed in the terminal device ages, the terminal device may not have the beam correspondence capability. Alternatively, when the terminal device is equipped with an external protective case or held by a person, the terminal device may not have the beam correspondence capability because of interference from the protective case or the hand. Alternatively, when an object approaches the terminal device, the terminal device may not have the beam correspondence capability. For example, when the terminal device is a mobile phone, when a user answers a call, the head approaches the terminal device. In this case, the terminal device may not have the beam correspondence capability. In other words, an application scenario of a high temperature, high humidity, or antenna aging or an application scenario in which the terminal device is equipped with an external protective case, or a person holds the terminal device, or an object approaches may be the second application scenario. In this application scenario, the terminal device does not have the beam correspondence capability.

It can be learned from the foregoing descriptions of the beam correspondence capability that, when the terminal device does not have the beam correspondence capability, if the terminal device still performs communication by using the beam correspondence capability, communication efficiency is usually reduced. However, currently, after the terminal device is delivered from a factory, the terminal device usually always considers by default that the terminal device has the beam correspondence capability, and reports information about the beam correspondence capability of the terminal device to the base station each time the terminal device accesses the base station. In this case, the terminal device does not detect whether the terminal device has the beam correspondence capability in various application scenarios.

However, in some application scenarios, for example, in a high-temperature weather or a rainy day with high humidity, the terminal device loses the beam correspondence capability. In this case, if the terminal device considers by default that the terminal device has the beam correspondence capability, the terminal device still reports, to the base station, that the terminal device has the beam correspondence capability. Correspondingly, the base station also always considers that the terminal device has the beam correspondence capability. Therefore, beam management is not performed between the terminal device and the base station. The beam management is used to repair a beam fault. To be specific, when the terminal device does not have the beam correspondence capability, the beam management is used to determine a beam used for transmission between the terminal device and the base station. Therefore, when the terminal device loses the beam correspondence capability but considers by default that the terminal device has the beam correspondence capability, beam fault repair fails because beam management is not performed. In addition, in this case, the terminal device still determines the uplink transmit beam b by using the downlink receive beam a, and transmits information to the base station by using the uplink transmit beam b. Consequently, communication efficiency is reduced, and even the base station cannot receive, when the uplink transmit beam b deviates from the base station by a relatively large angle, the information transmitted by using the uplink transmit beam b. As a result, radio link transmission between the base station and the terminal device fails, and a communication service cannot be performed.

To resolve the foregoing problem, an embodiment of this application discloses a beam correspondence capability reporting method. In the method, a terminal device determines, based on pre-obtained first determining information and a corresponding first determining condition, whether the terminal device has a beam correspondence capability. When the terminal device determines, based on the first determining information, that the terminal device has the beam correspondence capability, the terminal device further determines, based on whether communication information is successfully transmitted, whether the terminal device has the beam correspondence capability.

The first determining information may include information in a plurality of forms. For example, the first determining information generally includes an environment parameter threshold and/or a cell ID set. An environment parameter is at least one of a temperature or humidity. The cell ID set includes at least one cell ID.

The beam correspondence capability of the terminal device is relatively susceptible to an environment. In a high-temperature environment or a high-humidity environment, antenna performance easily changes. Consequently, the terminal device loses the beam correspondence capability. For example, when the user carries the terminal device into a sauna, the terminal device may not have the beam correspondence capability because of a high-temperature and high-humidity environment of the sauna. Therefore, in this embodiment of this application, the environment parameter may be used as determining information.

Figure 5:
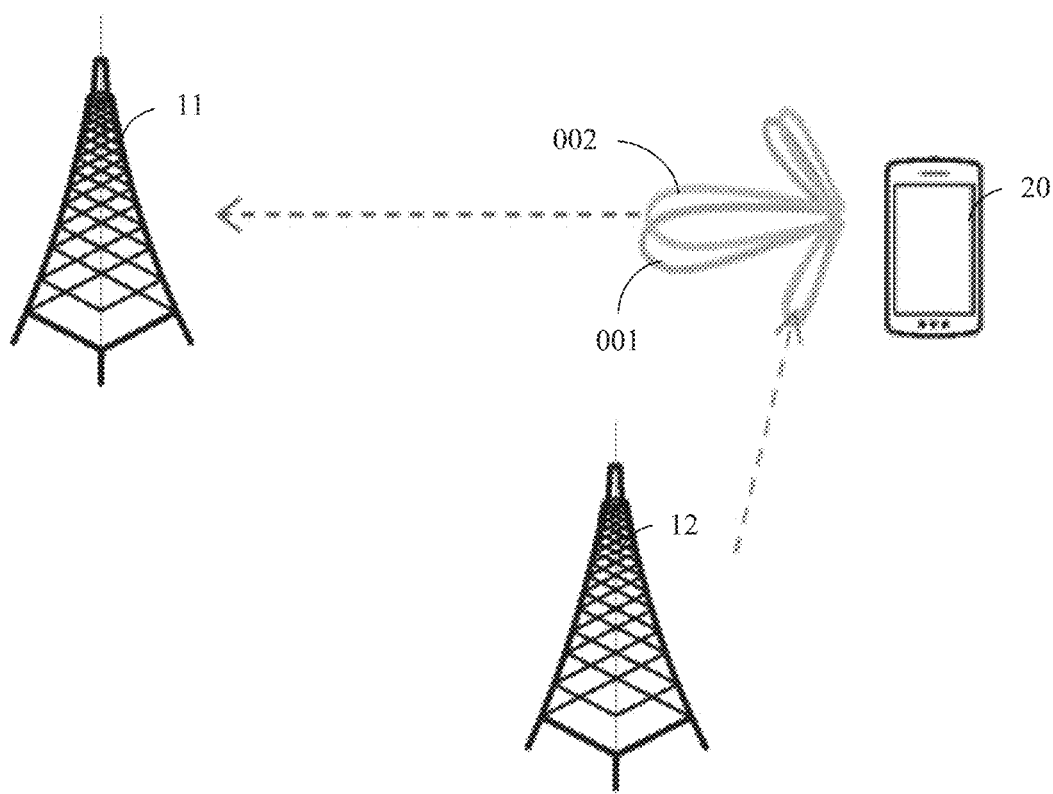
FIG. 5 is a schematic diagram of an application scenario of a beam correspondence capability reporting method according to an embodiment of this application.

In addition, in an actual application process, in addition to the high-temperature and high-humidity environment, the terminal device usually does not have the beam correspondence capability because of interference from a neighboring cell. For example, referring to a schematic diagram shown in FIG. 5, in an example, a first base station 11 and a second base station 12 are disposed, and the terminal device 20 accesses the first base station 11. In addition, a cell of the second base station 12 can cover an area of the terminal device 20, to be specific, the cell of the second base station 12 is a neighboring cell of the terminal device 20. It is assumed that a downlink receive beam used when the terminal device communicates with the first base station 11 is a first receive beam 001 when no neighboring cell exists, and a downlink receive beam used when the terminal device communicates with the first base station 11 is a second receive beam 002 when a neighboring cell exists. During downlink communication, to avoid interference from a neighboring cell, a direction of the second receive beam of the terminal device is usually adjusted. In this case, the second receive beam 002 deviates from the first receive beam 001.

When the terminal device has the beam correspondence capability, the terminal device may determine a corresponding uplink transmit beam based on the first receive beam. The uplink transmit beam is aligned with the first base station 11. However, the second receive beam is different from the first receive beam. In this case, an uplink transmit beam determined based on the second receive beam also deviates from the first base station 11. In this case, the terminal device does not have the beam correspondence capability. In other words, when the terminal device is interfered with by the neighboring cell, the terminal device usually loses the beam correspondence capability. Therefore, in this embodiment of this application, a cell ID may be used as determining information, and the cell ID is an ID of a cell to be accessed when the terminal device is interfered with by the neighboring cell.

In addition, the terminal device may not have the beam correspondence capability because of another factor. Correspondingly, the determining information may further include information of another type. This is not limited in this embodiment of this application.

Figure 6:
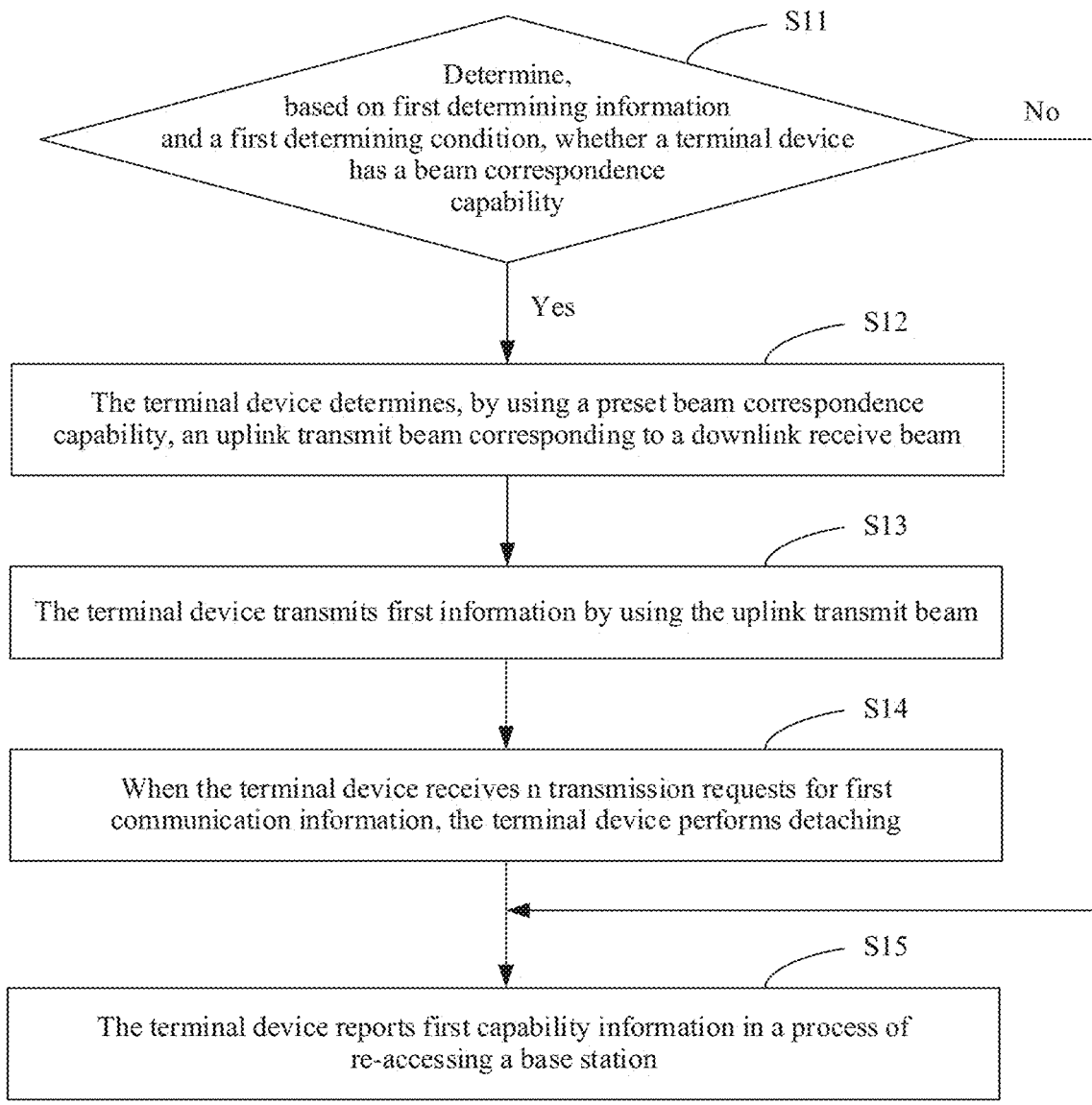
FIG. 6 is a schematic diagram of a working procedure of a beam correspondence capability reporting method according to an embodiment of this application.

Referring to a schematic diagram of a working procedure shown in FIG. 6, a beam correspondence capability reporting method disclosed in an embodiment of this application includes the following steps.

Step S11: A terminal device determines, based on pre-obtained first determining information and a first determining condition, whether the terminal device has a beam correspondence capability; and if yes, performs an operation in step S12; or if no, performs an operation in step S15.

The first determining information may include information in a plurality of forms. For example, the first determining information generally includes an environment parameter threshold and/or a cell ID set. An environment parameter is at least one of a temperature or humidity. The cell ID set includes at least one cell ID. When the terminal device accesses a cell corresponding to the cell ID, the terminal device does not have the beam correspondence capability under the influence of interference from a neighboring cell.

In addition, when the first determining information includes the environment parameter threshold, the terminal device usually determines, by performing the following step based on the pre-obtained first determining information and the first determining condition, whether the terminal device has the beam correspondence capability: When a current environment parameter is not less than the environment parameter threshold, the terminal device determines that the terminal device does not have the beam correspondence capability. When the current environment parameter of the terminal device is not less than the environment parameter threshold, it indicates that the terminal device is in a high-temperature or high-humidity environment. In this case, the terminal device may determine that the terminal device does not have the beam correspondence capability.

When the first determining information includes the environment parameter threshold, the terminal device may pre-determine the environment parameter threshold in the following manner:

When the terminal device determines that the terminal device does not have the beam correspondence capability (for example, when the terminal device receives n transmission requests for first communication information after the terminal device transmits the first communication information), the terminal device obtains at least one environment parameter. When the terminal device obtains m environment parameters, and none of the m environment parameters is less than a first parameter threshold, the terminal device determines the environment parameter threshold based on the m environment parameters, so as to use the environment parameter threshold as the first determining information in step S11, where m is a preset positive integer.

In addition, a plurality of manners may be used to determine the environment parameter threshold based on the m environment parameters. In a manner, a plurality of environment parameter values may be preset. The terminal device compares the m environment parameters with the plurality of environment parameter values. If none of the m environment parameters is less than some of the environment parameter values, the terminal device uses the some of the environment parameter values as first parameter thresholds, and determines a largest environment parameter value in the first parameter thresholds as the environment parameter threshold.

For example, if the environment parameter is a temperature, the plurality of preset environment parameter values are respectively 35 degrees, 37 degrees, and 39 degrees. When the m obtained environment parameters each are greater than 35 degrees and 37 degrees but less than 39 degrees, 35 degrees and 37 degrees are first parameter thresholds, and the terminal device determines that a larger first parameter threshold (that is, 37 degrees) is the environment parameter threshold.

In this manner, the environment parameter threshold is determined by using the preset environment parameter values, and the plurality of preset environment parameter values are corresponding environment parameters in the high-temperature or high-humidity environment. For example, in the foregoing example, the preset environment parameter values 35 degrees, 37 degrees, and 39 degrees each correspond to the high-temperature environment. Therefore, even if errors occur in some of the obtained environment parameters, the environment parameter threshold determined in this manner is still a corresponding environment parameter in the high-temperature or high-humidity environment. This can reduce an error that may occur when the environment parameter threshold is determined by using the environment parameter.

In another manner, the terminal device presets the first parameter threshold, and when none of the m environment parameters is less than the first parameter threshold, the terminal device determines that an average of the m environment parameters is the environment parameter threshold.

In this manner, the average of the m environment parameters greater than the first parameter threshold is used as the environment parameter threshold. In other words, when the environment parameter threshold is determined, with reference to an environment in which the terminal device is located, the obtained environment parameter threshold is applicable to an application scenario of the terminal device.

In this embodiment of this application, the first parameter threshold is a relatively high temperature value or a relatively high humidity value. If none of the m environment parameters is less than the first parameter threshold, it indicates that the terminal device is in the high-temperature or high-humidity environment. Further, it may be considered that the problem that the terminal device does not have the beam correspondence capability is caused by the high-temperature or high-humidity environment. Therefore, the environment parameter threshold may be determined based on the m environment parameters.

In addition, m is a preset positive integer, and generally may be a value greater than 1. For example, m is set to 3. In this case, the terminal device determines the environment parameter threshold by using a plurality of environment parameters. When the environment parameter threshold is determined by using a relatively small quantity of environment parameters, if errors occur in some of the environment parameters because of inaccurate measurement or the like, an error usually occurs in the environment parameter threshold. However, in this embodiment of this application, determining the environment parameter threshold by using a plurality of environment parameters can reduce this error, thereby improving accuracy of the environment parameter threshold.

When the first determining information is the cell ID set, that a terminal device determines, based on pre-obtained first determining information and a first determining condition, whether the terminal device has a beam correspondence capability includes:

When a cell ID of a current to-be-accessed cell is the same as any cell ID in the cell ID set, the terminal device determines that the terminal device does not have the beam correspondence capability.

When a cell ID of a cell to be accessed by the terminal device is the same as any cell ID in the cell ID set, it indicates that the terminal device is interfered with by a neighboring cell after the terminal device accesses a cell corresponding to the cell ID, and then loses the beam correspondence capability under the influence of the interference from the neighboring cell. Therefore, the terminal device may determine that the terminal device does not have the beam correspondence capability.

Further, in this embodiment of this application, the terminal device may pre-obtain information such as an environment parameter of the terminal device or a cell ID of an access cell generated each time the terminal device does not have the beam correspondence capability, use the information as the first determining information, and store the first determining information.

When the first determining information includes the cell ID set, the terminal device may pre-determine the cell ID set in the following manner:

When the terminal device determines that the terminal device does not have the beam correspondence capability (for example, when the terminal device receives n transmission requests for first communication information after the terminal device transmits the first communication information), the terminal device obtains a signal to interference plus noise ratio SINR of a downlink receive beam.

When the SINR is greater than a preset second parameter threshold, the terminal device adds a cell ID of a currently accessed cell to the cell ID set.

When the SINR is greater than the preset second parameter threshold, it indicates that the terminal device is severely interfered with by a neighboring cell, and the terminal device does not have the beam correspondence capability because of the interference. In this case, the terminal device adds the cell ID of the currently accessed cell to the cell ID set, to obtain a cell ID set including at least one cell ID.

The foregoing describes a method for obtaining the first determining information in this embodiment of this application. In addition, in this embodiment of this application, the first determining information may be supplemented and updated based on a case in which the terminal device does not have the beam correspondence capability in an application process.

Step S12: When the terminal device determines that the terminal device has the beam correspondence capability, and a beam strength of a downlink receive beam of the terminal device is not less than a preset first strength threshold, the terminal device determines, by using a preset beam correspondence capability, an uplink transmit beam corresponding to the downlink receive beam.

The beam strength includes reference information received power (reference signal received power, RSRP) and/or reference information received quality (reference signal received quality, RSRQ).

If the beam strength of the downlink receive beam of the terminal device is not less than the preset first strength threshold, it indicates that communication quality of the downlink receive beam is relatively good, and it is generally considered that the downlink receive beam is an optimal downlink receive beam. In addition, the uplink transmit beam corresponding to the downlink receive beam may be determined based on the beam correspondence capability of the terminal device.

In addition, the first strength threshold may be set based on an actual communication requirement. In a feasible example, when the beam strength is RSRP, the first strength threshold may be −95 dB. Certainly, the first strength threshold may alternatively be another value. This is not limited in this embodiment of this application.

In this embodiment of this application, the terminal device presets the beam correspondence capability. In this case, the terminal device may determine, by using the preset beam correspondence capability, the uplink transmit beam corresponding to the downlink receive beam. For example, when the beam correspondence capability is reflected by using a correspondence between each downlink receive beam and an optimal uplink transmit beam corresponding to the downlink receive beam and a correspondence between each uplink transmit beam and an optimal downlink receive beam corresponding to the uplink transmit beam that are set in the terminal device, the terminal device may query the correspondences to determine the uplink transmit beam corresponding to the downlink receive beam.

Step S13: The terminal device transmits the first communication information by using the uplink transmit beam.

In this step, the terminal device may transmit the first communication information to a TRP on a base station side by using the uplink transmit beam. The first communication information may be information that needs to be transmitted to a base station in a process in which the terminal device performs various communication services after the terminal device accesses a cell of the terminal device. For example, when the terminal device accesses a network, the first communication information may be network request information of the terminal device.

Step S14: When the terminal device receives the n transmission requests for the first communication information, the terminal device performs detaching, where n is a preset positive integer greater than 1.

Herein, n is a positive integer greater than 1, and a specific value of n may be set and adjusted based on a beam correspondence capability reporting requirement of the terminal device. In an example, the specific value of n may be set before delivery. In a subsequent application process, when a requirement for beam correspondence capability detection precision is relatively high, the value of n may be adjusted to a relatively small value; or when a requirement for beam correspondence capability detection precision is relatively low, the value of n may be adjusted to a relatively large value.

After the terminal device transmits the first communication information to the base station by using the uplink transmit beam, if the base station receives the first communication information, the base station transmits corresponding feedback information to the terminal device. In addition, if the base station does not receive the first communication information, the base station further transmits a transmission request for the first communication information to the terminal device. The transmission request for the first communication information is used to request the terminal device to send the first communication information again. Moreover, each time the terminal device receives a transmission request for the first communication information, the terminal device responds to the request, to be specific, transmits the first communication information to the base station again by using the uplink transmit beam. In a process in which the base station communicates with the terminal device, the base station may send and receive information through the TRP of the base station.

If the terminal device receives the n transmission requests for the first communication information, it indicates that the base station does not receive the first communication information when the terminal device transmits the first communication information to the base station by using the uplink transmit beam for a plurality of times. In other words, the uplink transmit beam deviates from the base station.

Further, because the uplink transmit beam is obtained by using the beam correspondence capability of the terminal device, when it is determined that the uplink transmit beam deviates from the base station, it indicates that an uplink transmit-receive beam pair that actually needs to be used is different from an uplink transmit-receive beam pair obtained by using the beam correspondence capability and the beam correspondence capability that is previously preset by the terminal device does not take effect in a current scenario. In this case, the terminal device may determine that the terminal device currently does not have the beam correspondence capability.

Step S15: The terminal device reports first capability information in a process of re-accessing a base station, where the first capability information indicates that the terminal device does not have the beam correspondence capability.

When the terminal device does not access a network provided by the base station, the terminal device deregisters the network, and this operation is a detach (detach) operation. When determining that the terminal device does not have the beam correspondence capability, the terminal device may perform detaching, and report the first capability information to the base station in the process of re-accessing the base station. The first capability information indicates that the terminal device does not have the beam correspondence capability. In this way, the base station determines that the terminal device does not have the beam correspondence capability.

Figure 7:
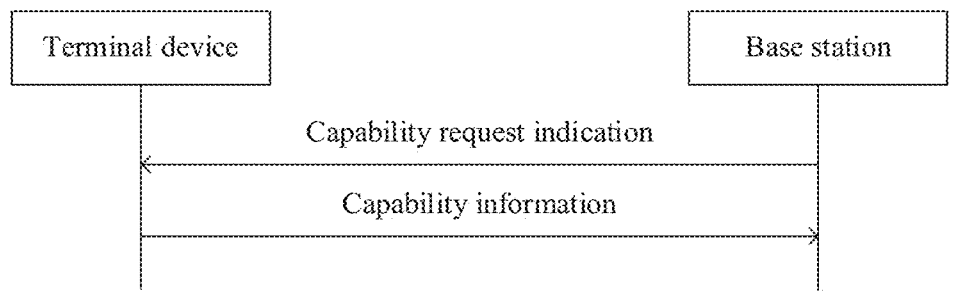
FIG. 7 is a schematic diagram of information exchange between a base station and a terminal device in a beam correspondence capability reporting method according to an embodiment of this application.

Referring to a schematic diagram of information exchange shown in FIG. 7, in a process in which the terminal device accesses the base station, the base station usually transmits a capability request indication (for example, a UE Capability Enquiry indication) to the terminal device, to indicate the terminal device to report capability information of the terminal device to the base station. After receiving the capability request indication, the terminal device reports corresponding capability information (for example, UE Capability Information information) to the base station. The capability information indicates whether the terminal device has the beam correspondence capability.

Specifically, the capability information includes a field used to indicate whether the terminal device has the beam correspondence capability. Different bytes may be set in the field to indicate whether the terminal device has the beam correspondence capability.

In a feasible example, when a byte "1" is set in the field, it may indicate that the terminal device has the beam correspondence capability; and when a byte "0" is set in the field, it may indicate that the terminal device does not have the beam correspondence capability. In this example, the first capability information is capability information for which "0" is set in the field.

In addition, if the terminal device determines, by performing the operation in step S14, that the terminal device has the beam correspondence capability, the terminal device may return to perform the operation in step S11 at an interval of a preset period, to be specific, the terminal device re-determines, based on the first determining information and the first determining condition at the interval of the preset period, whether the terminal device has the beam correspondence capability. In this case, because the operation in step S11 is performed at the interval of the preset period, the terminal device can detect, in time in an application process, that the terminal device does not have the beam correspondence capability.

Duration of the preset period may be set when the terminal device is delivered from a factory, and the duration of the preset period may be adjusted based on a detection precision requirement and a received adjustment operation. For example, when the detection precision requirement is relatively high, the duration of the preset period may be adjusted to relatively short duration; or when the detection precision requirement is relatively low, the duration of the preset period may be adjusted to relatively long duration.

According to the beam correspondence capability reporting method disclosed in this embodiment of this application, the beam correspondence capability of the terminal device may be measured, and reporting is performed when it is determined that the terminal device does not have the beam correspondence capability. This avoids a case in which communication efficiency is reduced because the terminal device still transmits information by using an inappropriate transmit-receive beam pair when the terminal device does not have the beam correspondence capability.

Further, in this embodiment of this application, the terminal device may determine, based on whether two factors, namely, the first determining information and the first communication information, are successfully sent, whether the terminal device has the beam correspondence capability, so that the terminal device can accurately determine whether the terminal device has the beam correspondence capability.

In addition, in this embodiment of this application, when the terminal device determines, by using the first determining information, that the terminal device does not have the beam correspondence capability, the terminal device does not need to perform the operations in step S12 and step S13, but directly performs detaching and reports the first capability information in the process of re-accessing the base station. In other words, in this embodiment of this application, the terminal device first determines, by using the determining information, whether the terminal device has the beam correspondence capability, and when determining that the terminal device does not have the beam correspondence capability, directly reports the first capability information and does not need to determine, based on whether the first communication information is successfully sent, whether the terminal device has the beam correspondence capability. This saves power consumption generated when the terminal device sends the first communication information. Moreover, when determining, based on whether the first communication information is successfully sent, whether the terminal device has the beam correspondence capability, the terminal device usually needs to send the first communication information for a plurality of times. This is relatively time-consuming. Therefore, a manner of preferably determining, by using the first determining information, whether the terminal device has the beam correspondence capability can also improve efficiency of determining, by the terminal device, whether the terminal device has the beam correspondence capability.

The foregoing embodiment discloses an operation that the terminal device determines, based on the first determining information and the first determining condition, whether the terminal device has the beam correspondence capability. The first determining information includes the environment parameter threshold and/or the cell ID set, and the environment parameter is at least one of temperature or the humidity.

The terminal device may pre-obtain information such as an environment parameter of the terminal device or a cell ID of an access cell generated each time the terminal device does not have the beam correspondence capability, determine the first determining information based on the information, and store the first determining information. For example, the first determining information may be stored in a blacklist of the terminal device. In addition, the first determining information may be further obtained based on a case in which the terminal device does not have the beam correspondence capability in an application process. For this case, this application further discloses another embodiment.

Figure 8:
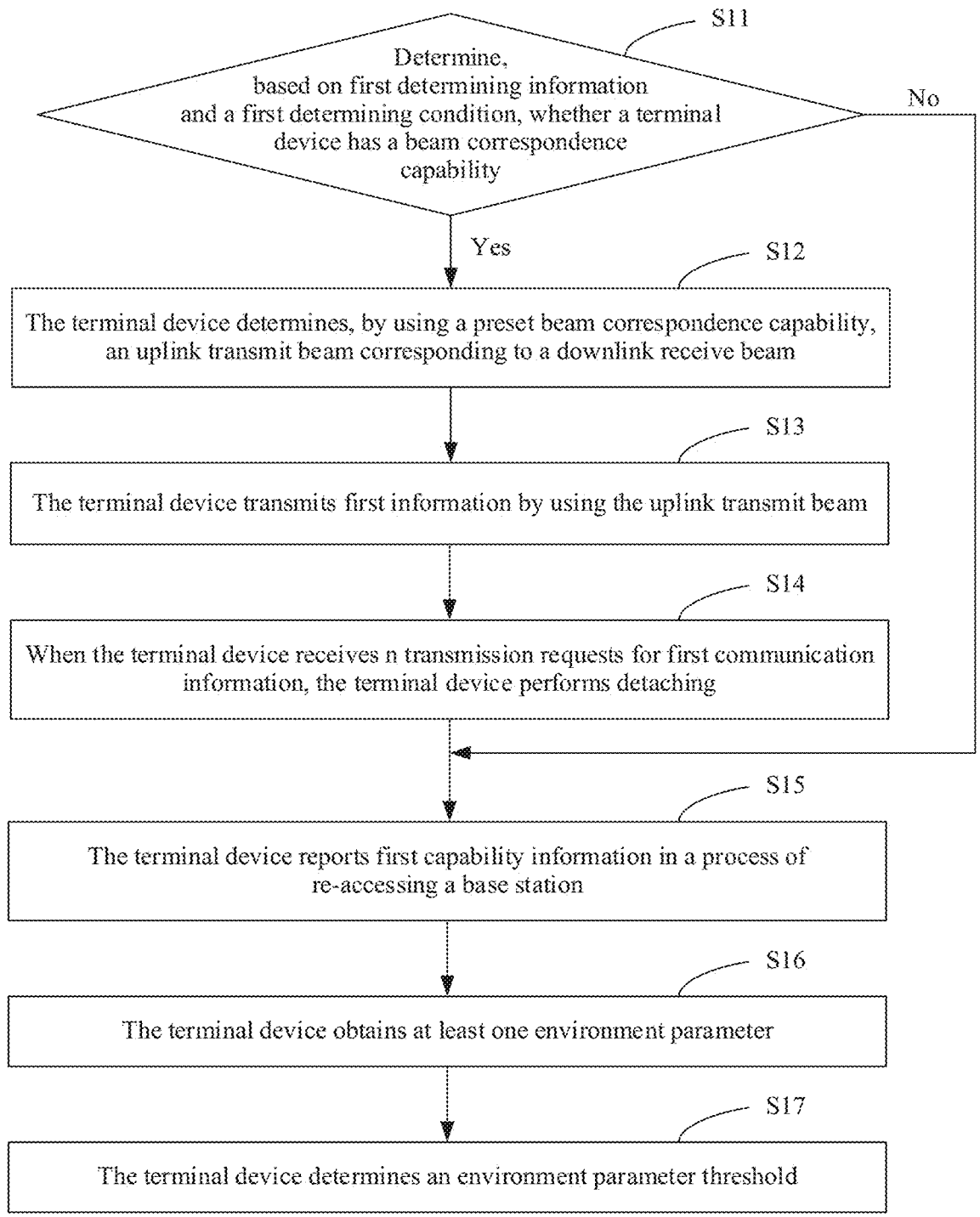
FIG. 8 is a schematic diagram of a working procedure of another beam correspondence capability reporting method according to an embodiment of this application.

Referring to a schematic diagram of a working procedure shown in FIG. 8, when the first determining information is the environment parameter threshold, the environment parameter threshold may be further updated. In this case, this embodiment of this application further discloses the following steps.

Step S16: When the terminal device receives the n transmission requests for the first communication information, the terminal device obtains the at least one environment parameter.

The environment parameter is the at least one of the temperature or the humidity. When the terminal device receives the n transmission requests for the first communication information, it indicates that the terminal device currently does not have the beam correspondence capability. In this case, each time the terminal device determines that the terminal device does not have the beam correspondence capability, the terminal device may obtain the at least one current environment parameter.

In addition, the terminal device may measure the environment parameter by using a built-in environment parameter measurement component of the terminal device. For example, the terminal device may detect the temperature by using a built-in temperature sensor, or may detect the humidity by using a built-in humidity sensor. Alternatively, the terminal device may be connected to another measurement device through a network, to obtain an environment parameter transmitted by the another measurement device.

According to proposals R1-1702941 and R1-1612732, it can be learned that the terminal device may lose the beam correspondence capability in a high-temperature or high-humidity case. For example, when a user carries the terminal device into a sauna, the terminal device may not have the beam correspondence capability because of a high-temperature and high-humidity environment of the sauna. Therefore, in this embodiment of this application, the terminal device needs to obtain the environment parameter.

Step S17: When the at least one environment parameter is not less than the first parameter threshold, the terminal device determines the environment parameter threshold based on the at least one environment parameter and a historical environment parameter that is not less than the first parameter threshold.

The determined environment parameter threshold belongs to the first determining information. In other words, the environment parameter threshold in the first determining information is updated by performing the operation in step S17. In this case, when the terminal device performs step S11 again, to be specific, when the terminal device needs to re-determine, based on the first determining information and the first determining condition, whether the terminal device has the beam correspondence capability, the terminal device may perform determining by using the environment parameter threshold determined in step S17, in other words, the terminal device re-determines the beam correspondence capability by using an updated environment parameter threshold.

In this embodiment of this application, each time the terminal device receives the n transmission requests for the first communication information, the terminal device obtains the at least one environment parameter, and when the at least one obtained environment parameter is not less than the first parameter threshold, the terminal device determines the environment parameter threshold based on the at least one environment parameter and the historical environment parameter that is not less than the first parameter threshold. The historical environment parameter is an environment parameter previously obtained by the terminal device.

The first parameter threshold is a preset value of a corresponding environment parameter in the high-temperature or high-humidity environment. For example, the first parameter threshold may be set to 35 degrees. In this case, when none of the m environment parameters is less than the first parameter threshold, it indicates that the terminal device does not have the beam correspondence capability because the terminal device is in the high-temperature or high-humidity environment. In this case, the terminal device re-determines the environment parameter threshold based on the at least one currently obtained environment parameter and the previously-obtained historical environment parameter.

According to the method in step S16 and step S17, when the terminal device receives the n transmission requests for the first communication information, to be specific, when the terminal device may determine that the terminal device does not have the beam correspondence capability, the terminal device updates the environment parameter threshold. During updating, the terminal device determines the environment parameter threshold each time based on the at least one currently obtained environment parameter and the previously-obtained historical environment parameter that is not less than the first parameter threshold. In addition, when the terminal device does not have the beam correspondence capability again, the terminal device uses the at least one previously-obtained environment parameter as the historical environment parameter, and re-determines the environment parameter threshold.

In other words, when the terminal device does not have the beam correspondence capability, the terminal device obtains a environment parameters, where a is a preset positive integer. When the a environment parameters are not less than the first parameter threshold, and b previously-obtained environment parameters are not less than the first parameter threshold either (in other words, there are b historical environment parameters that are not less than the first parameter threshold), the terminal device determines an environment parameter threshold based on the a environment parameters and the b historical environment parameters that are not less than the first parameter threshold.

In addition, when the terminal device does not have the beam correspondence capability again, the a previously-obtained environment parameters are referred to as historical environment parameters, to be specific, there are "a+b" historical parameter parameters that are not less than the first parameter threshold. In this case, the terminal device obtains a environment parameters again, and then determines an environment parameter threshold based on the a environment parameters obtained again and the "a+b" historical environment parameters.

The environment parameter threshold may be obtained in a plurality of manners. In one manner, in this embodiment of this application, a plurality of environment parameter values may be preset. In addition, each time the terminal device receives the n transmission requests for the first communication information (in other words, when the terminal device determines that the terminal device does not have the beam correspondence capability), the terminal device obtains the at least one environment parameter.

In addition, a plurality of manners may be used to determine the environment parameter threshold based on the at least one environment parameter and the historical environment parameter that is not less than the first parameter threshold.

In one manner, the terminal device presets a plurality of environment parameter values. After the terminal device obtains the at least one environment parameter, if none of the at least one environment parameter and the historical environment parameter is less than some of the environment parameter values when the at least one environment parameter and the historical environment parameter are separately compared with the plurality of environment parameter values, the terminal device uses the some of the environment parameter values as first parameter thresholds, and determines a largest environment parameter value in the first parameter thresholds as the environment parameter threshold.

For example, if the environment parameter is a temperature, the plurality of preset environment parameter values are respectively 35 degrees, 37 degrees, and 39 degrees. When the at least one obtained environment parameter and the historical environment parameter each are greater than 35 degrees and 37 degrees but less than 39 degrees, 35 degrees and 37 degrees are first parameter thresholds, and the terminal device determines that a larger first parameter threshold (that is, 37 degrees) is the environment parameter threshold.

In this manner, the environment parameter threshold is determined by using the preset environment parameter values, and the plurality of preset environment parameter values are corresponding environment parameters in the high-temperature or high-humidity environment. For example, in the foregoing example, the preset environment parameter values 35 degrees, 37 degrees, and 39 degrees each correspond to the high-temperature environment. Therefore, even if errors occur in some of the obtained environment parameters, the environment parameter threshold determined in this manner is still a corresponding environment parameter in the high-temperature or high-humidity environment. This can reduce an error that may occur when the environment parameter threshold is determined by using the environment parameter.

In another manner, the terminal device presets the first parameter threshold, and when none of the at least one environment parameter and the historical environment parameter is less than the first parameter threshold, the terminal device determines that an average of the at least one environment parameter and the historical environment parameter is the environment parameter threshold.

In this manner, the average of the at least one environment parameter and the historical environment parameter that are greater than the first parameter threshold is used as the environment parameter threshold. In other words, when the environment parameter threshold is determined, with reference to an environment in which the terminal device is located, the obtained environment parameter threshold is applicable to an application scenario of the terminal device.

In this embodiment of this application, the first parameter threshold is a relatively high temperature value or a relatively high humidity value. If none of the at least one environment parameter is less than the first parameter threshold, it indicates that the terminal device is in the high-temperature or high-humidity environment. Further, it may be considered that the problem that the terminal device does not have the beam correspondence capability is caused by the high-temperature or high-humidity environment. Therefore, the environment parameter threshold may be determined based on the at least one environment parameter and the historical environment parameter that is not less than the first parameter threshold.

The foregoing embodiment discloses a method for obtaining an environment parameter threshold in an application process of the terminal device, so that the environment parameter threshold can be updated in the application process of the terminal device.

After the environment parameter threshold is determined, in a subsequent application process, when a current environment parameter of the terminal device is not less than the environment parameter threshold, it indicates that an environment in which the terminal device is currently located is the high-temperature or high-humidity environment in which the terminal device does not have the beam correspondence capability. Further, the terminal device may determine that the terminal device does not have the beam correspondence capability. In other words, the terminal device may determine, based on the environment parameter threshold, an environment condition in which the terminal device does not have the beam correspondence capability, and further determine whether the terminal device needs to proactively report the first capability information, so as to determine, based on the first determining information, whether the terminal device has the beam correspondence capability.

When the first determining information includes the environment parameter threshold, that a terminal device determines, based on pre-obtained first determining information and a first determining condition, whether the terminal device has a beam correspondence capability includes:

If a current environment parameter is not less than the environment parameter threshold, the terminal device determines that the terminal device does not have the beam correspondence capability.

In other words, when the first determining information is the environment parameter threshold, the terminal device compares the environment parameter threshold with the current environment parameter. When the current environment parameter is not less than the environment parameter threshold, the terminal device determines that the terminal device does not have the beam correspondence capability.

For example, when the user carries the terminal device into the sauna, the high-temperature and high-humidity environment of the sauna may cause the problem that the terminal device loses the beam correspondence capability. When determining, by performing the operations in the steps in the foregoing embodiment, that the terminal device does not have the beam correspondence capability, the terminal device determines the environment parameter threshold based on an environment parameter of the sauna. In this case, when the user carries the terminal device into the sauna again, the terminal device may determine that a current environment parameter is not less than the environment parameter threshold, so as to determine that the terminal device does not have the beam correspondence capability, and proactively report the first capability information.

Figure 9:
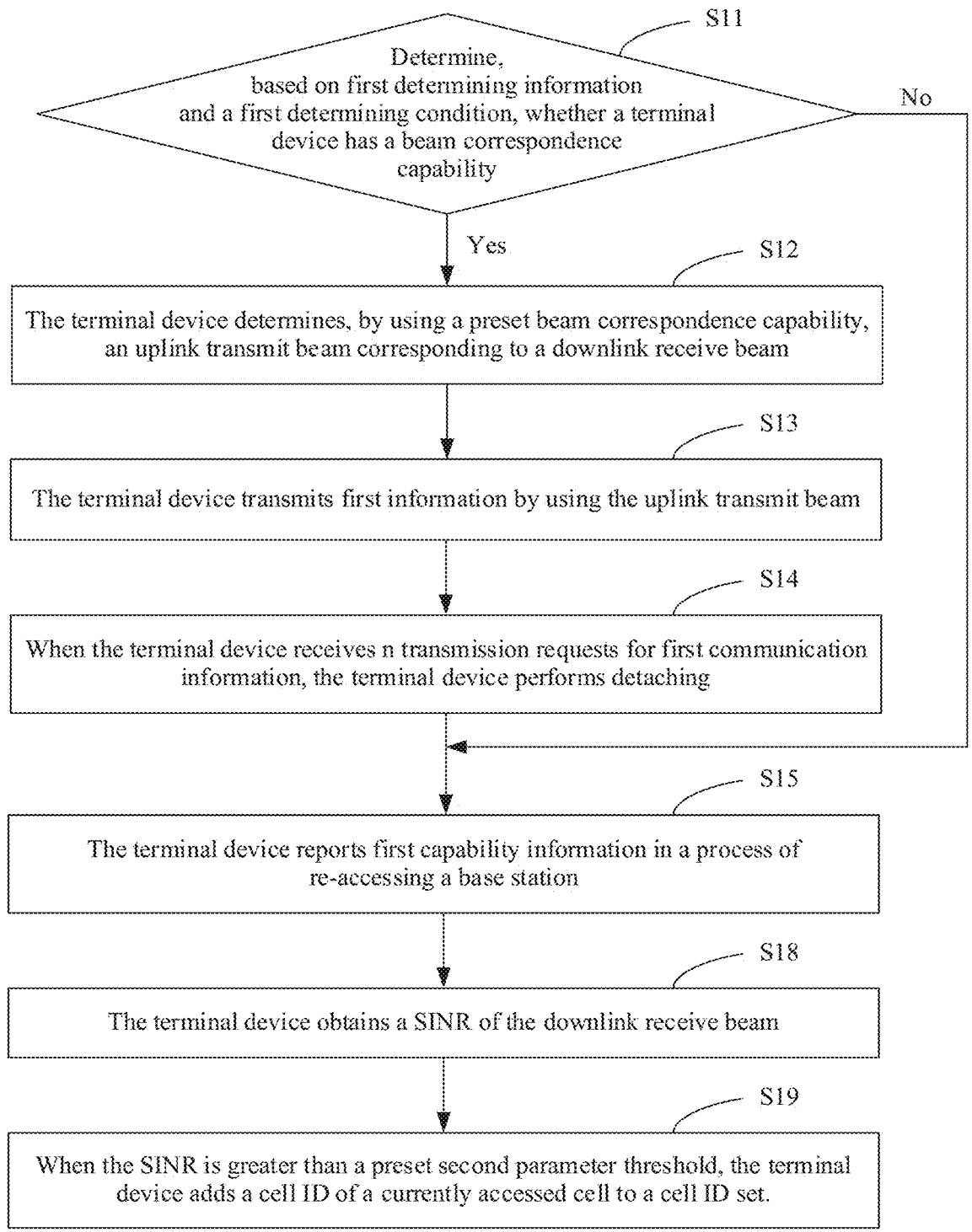
FIG. 9 is a schematic diagram of a working procedure of another beam correspondence capability reporting method according to an embodiment of this application.

In addition, the first determining information may alternatively be the cell ID set, and the cell ID set includes the at least one cell ID. Referring to a schematic diagram of a working procedure shown in FIG. 9, this embodiment of this application further discloses the following steps.

Step S18: When the terminal device receives the n transmission requests for the first communication information, the terminal device obtains the signal to interference plus noise ratio (signal to interference plus noise ratio, SINR) of the downlink receive beam.

The SINR of the downlink receive beam can reflect whether the downlink receive beam is interfered with.

Step S19: When the SINR is greater than the preset second parameter threshold, the terminal device adds the cell ID of the currently accessed cell to the cell ID set.

In the process in which the terminal device accesses the base station, the terminal device may obtain the cell ID of the currently accessed cell. In addition, when the SINR is greater than the preset second parameter threshold, it indicates that the terminal device is severely interfered with by a neighboring cell, and the terminal device does not have the beam correspondence capability because of the interference. In this case, the terminal device adds the cell ID of the currently accessed cell to the cell ID set.

In this embodiment of this application, according to the foregoing steps, the terminal device may obtain a cell ID of a cell accessed by the terminal device when the terminal device does not have the beam correspondence capability because of interference from a neighboring cell, and add the cell ID to the cell ID set, where the cell ID set belongs to the first determining information.

When the first determining information is the cell ID set, that a terminal device determines, based on pre-obtained first determining information and a first determining condition, whether the terminal device has a beam correspondence capability includes:

When a cell ID of a cell currently to be accessed by the terminal device is the same as a cell ID included in the cell ID set, the terminal device determines that the terminal device does not have the beam correspondence capability.

When the cell ID of the cell currently to be accessed by the terminal device is the same as a cell ID included in the cell ID set, it indicates that the terminal device is usually interfered with by a neighboring cell after the terminal device accesses the cell, and consequently the terminal device does not have the beam correspondence capability.

The foregoing embodiment discloses a method for obtaining a cell ID in a cell ID set in an application process of the terminal device.

In addition, each time the terminal device obtains a cell ID set that needs to be added to the cell ID, the terminal device may add the cell ID to the cell ID set and store the cell ID set. In this case, the terminal device may simultaneously store a plurality of cell IDs. When the cell ID of the cell currently to be accessed by the terminal device is the same as any cell ID, the terminal device proactively reports the first capability information when determining that the terminal device does not have the beam correspondence capability. This can improve accuracy of determining, by using a cell ID, whether the terminal device has the beam correspondence capability.

Alternatively, after adding a cell ID to the cell ID set, the terminal device may further determine a frequency at which the terminal device accesses each cell ID, and store only an ID of a cell that is accessed by the terminal device at a relatively high frequency, and does not store an ID of another cell with a relatively low frequency. Because a frequency at which the terminal device accesses another cell ID is relatively low, it may be considered that a possibility that the terminal device accesses the another cell ID is relatively low. In this case, the another cell ID is not stored. This can reduce memory space occupation of the terminal device, and further reduce a step of matching a cell ID of a current to-be-accessed cell with a cell stored in the terminal device, thereby improving efficiency of determining, by the terminal device, whether the terminal device has the beam correspondence capability.

According to the foregoing embodiment, in the application process of the terminal device, the environment parameter threshold may be updated, or a cell ID of a cell accessed when the terminal device is interfered with by a neighboring cell and consequently does not have the beam correspondence capability can be determined and the cell ID is added to the cell ID set.

In this case, the terminal device preferably determines, by using the first determining information, whether the terminal device has the beam correspondence capability. Compared with a manner of determining, based on whether the first communication information is successfully sent, whether the terminal device has the beam correspondence capability, a manner of determining, based on the first determining information, whether the terminal device has the beam correspondence capability can save power consumption generated when the terminal device sends the first communication information, and is relatively time-saving. Therefore, preferably determining, by using the first determining information, whether the terminal device has the beam correspondence capability can improve efficiency of determining, by the terminal device, whether the terminal device has the beam correspondence capability.

Figure 10:
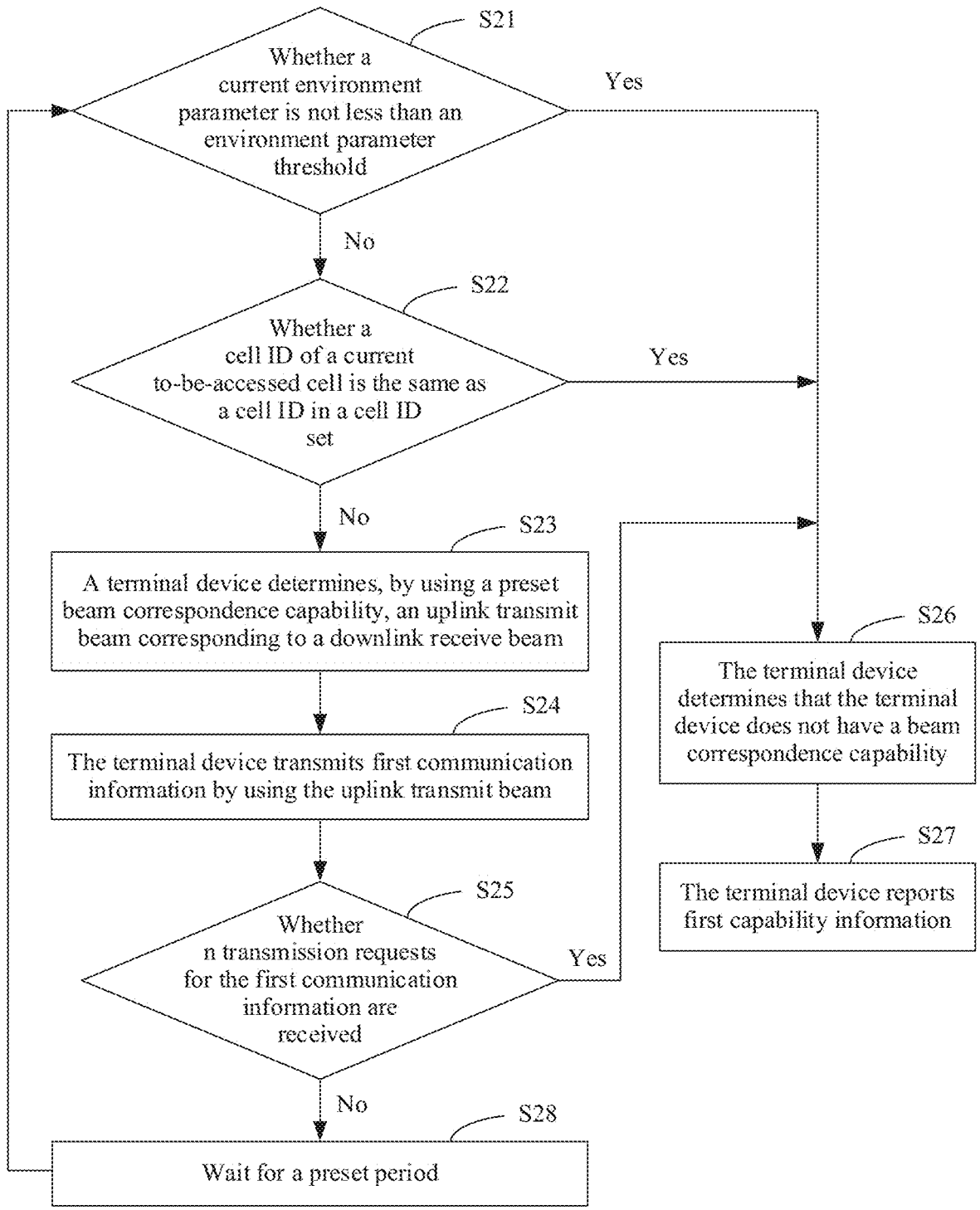
FIG. 10 is a schematic diagram of a working procedure of another beam correspondence capability reporting method according to an embodiment of this application.

In addition, when determining, by using the first determining information, that the terminal device has the beam correspondence capability, the terminal device determines again, based on whether the first communication information is successfully sent, whether the terminal device has the beam correspondence capability. In other words, the terminal device can determine, based on whether two factors, namely, the first determining information and the first communication information, are successfully sent, whether the terminal device has the beam correspondence capability. This can improve accuracy of determining whether the terminal device has the beam correspondence capability To describe in detail an operation that the terminal device determines whether the terminal device has the beam correspondence capability and reports the beam correspondence capability based on a determining result, as refinement of the method in FIG. 6, this application discloses another embodiment. Referring to a schematic diagram of a working procedure shown in FIG. 10, a beam correspondence capability reporting method disclosed in an embodiment of this application includes the following steps.

Step S21: A terminal device determines whether a current environment parameter is not less than an environment parameter threshold; and if no, performs an operation in step S22; or if yes, performs an operation in step S26.

An environment parameter is at least one of a temperature or humidity. The environment parameter threshold may be determined by performing the operations in step S16 and step S17, and may be recorded in a blacklist of the terminal device after the determining, so that the environment parameter threshold is extracted from the blacklist each time step S21 is performed.

In addition, when the current environment parameter of the terminal device is not less than the environment parameter threshold, it indicates that the terminal device is in a high-temperature or high-humidity environment. In this case, the terminal device usually does not have a beam correspondence capability.

Step S22: When the terminal device determines that the current environment parameter is less than the environment parameter threshold, the terminal device determines whether a cell ID of a current to-be-accessed cell is the same as a cell ID included in the cell ID set; and if no, performs an operation in step S23; or if yes, performs an operation in step S26.

The cell ID set includes at least one cell ID. When the cell ID of the current to-be-accessed cell is the same as a cell ID in the cell ID set, it indicates that the terminal device is interfered with by a neighboring cell after the terminal device accesses the to-be-accessed cell, and consequently the terminal device loses the beam correspondence capability.

The cell ID in the cell ID set may be determined by performing the operations in step S18 and step S19, and may be recorded in the blacklist of the terminal device after the determining, so that the cell ID set is extracted from the blacklist each time step S22 is performed. Then, the terminal device compares the cell ID of the current to-be-accessed cell with each cell ID in the cell ID set.

The operations in step S21 and step S22 mean that the terminal device determines, based on pre-obtained first determining information and a first determining condition, whether the terminal device has the beam correspondence capability. The first determining information includes the environment parameter threshold in step S21 and the cell ID set in step S22.

In addition, in the foregoing operations, when determining, by using the first determining information, whether the terminal device has the beam correspondence capability, the terminal device first performs determining by using the environment parameter threshold, and then performs determining by using the cell ID set. However, in an actual application process, there is no strict time sequence for performing the operations. For example, the operation in step S22 may be performed before the operation in step S21. In other words, the terminal device first determines whether the cell ID of the current to-be-accessed cell is the same as any ID in the cell ID set. If the cell ID of the current to-be-accessed cell is different from the any ID in the cell ID set, the terminal device determines whether the current environment parameter is not less than the environment parameter threshold. When determining that the current environment parameter is less than the environment parameter threshold, the terminal device performs the operation in step S23. Alternatively, the terminal device may simultaneously determine whether the current environment parameter is not less than the environment parameter threshold and whether the cell ID of the to-be-accessed cell is the same as a cell ID included in the cell ID set. When two determining results are no, the terminal device performs the operation in step S23.

Step S23: When a beam strength of a downlink receive beam of the terminal device is not less than a preset first strength threshold, the terminal device determines, by using a preset beam correspondence capability, an uplink transmit beam corresponding to the downlink receive beam.

According to the operations in step S21 and step S22, when the terminal device determines that the current environment parameter is less than the environment parameter threshold and determines that the cell ID of the to-be-accessed cell is different from a cell ID in the cell ID set, it is considered that the terminal device currently has the beam correspondence capability, and performs subsequent communication by using the beam correspondence capability. In this case, during communication, the terminal device may further determine, based on whether communication information is successfully sent, whether the terminal device has the beam correspondence capability.

Step S24: The terminal device transmits first communication information by using the uplink transmit beam.

Step S25: The terminal device determines whether the terminal device receives n transmission requests for the first communication information; and if yes, performs an operation in step S26.

Herein, n is a preset positive integer greater than 1.

In addition, if the terminal device does not receive a transmission request for the first communication information, or if the terminal device receives a transmission request for the first communication information but a quantity of transmission requests is less than n, it indicates that the terminal device can successfully send the first communication information to a base station. Therefore, it may be considered that the terminal device has the beam correspondence capability.

Step S26: The terminal device determines that the terminal device does not have the beam correspondence capability.

Step S27: The terminal device performs detaching, and reports first capability information in a process of re-accessing a base station, where the first capability information indicates that the terminal device does not have the beam correspondence capability.

In addition, if the terminal device determines, by performing the operation in step S24, that the terminal device does not receive the n transmission requests for the first communication, the terminal device may further perform the following operation:

Step S28: Wait for a preset period, and then return to perform the operation in step S21.

If the terminal device determines, by performing the operation in step S24, that the terminal device does not receive the n transmission requests for the first communication, it usually indicates that the terminal device has the beam correspondence capability. In this case, the terminal device may return to perform the operation in step S21 after waiting for the preset period. To be specific, the terminal device determines again whether the terminal device has the beam correspondence capability, so that the terminal device detects in time a case in which the terminal device does not have the beam correspondence capability.

Duration of the preset period may be set when the terminal device is delivered from a factory, and the duration of the preset period may be adjusted based on a detection precision requirement and a received adjustment operation. For example, when the detection precision requirement is relatively high, the duration of the preset period may be adjusted to relatively short duration; or when the detection precision requirement is relatively low, the duration of the preset period may be adjusted to relatively long duration.

According to the solution in this embodiment of this application, the terminal device preferably determines, based on determining information and current information corresponding to the determining information, whether the terminal device has the beam correspondence capability. When determining that the terminal device has the beam correspondence capability, the terminal device determines again, based on whether the first communication information is successfully sent, whether the terminal device has the beam correspondence capability.

In other words, in the solution in this embodiment of this application, a manner of determining whether the first determining information is successfully sent and a manner of determining whether the first communication information is successfully sent may be used to determine whether the terminal device has the beam correspondence capability. This implements relatively high detection precision. In addition, when determining, based on whether the first communication information is successfully sent, that the terminal device does not have the beam correspondence capability, the terminal device proactively reports the first capability information. This can avoid a case in which communication efficiency is reduced because the terminal device still transmits information by using an inappropriate transmit-receive beam pair when the terminal device does not have the beam correspondence capability.

Further, in the solution in this embodiment of this application, the terminal device preferably determines, by using the first determining information, whether the terminal device has the beam correspondence capability, and directly reports the first capability information when determining that the terminal device does not have the beam correspondence capability. This saves power consumption generated when the terminal device sends the first communication information. Moreover, when determining, based on whether the first communication information is successfully sent, whether the terminal device has the beam correspondence capability, the terminal device usually needs to send the first communication information for a plurality of times. This is relatively time-consuming. Therefore, a manner of preferably determining, by using the first determining information, whether the terminal device has the beam correspondence capability can also improve efficiency of determining, by the terminal device, whether the terminal device has the beam correspondence capability.

Figure 11:
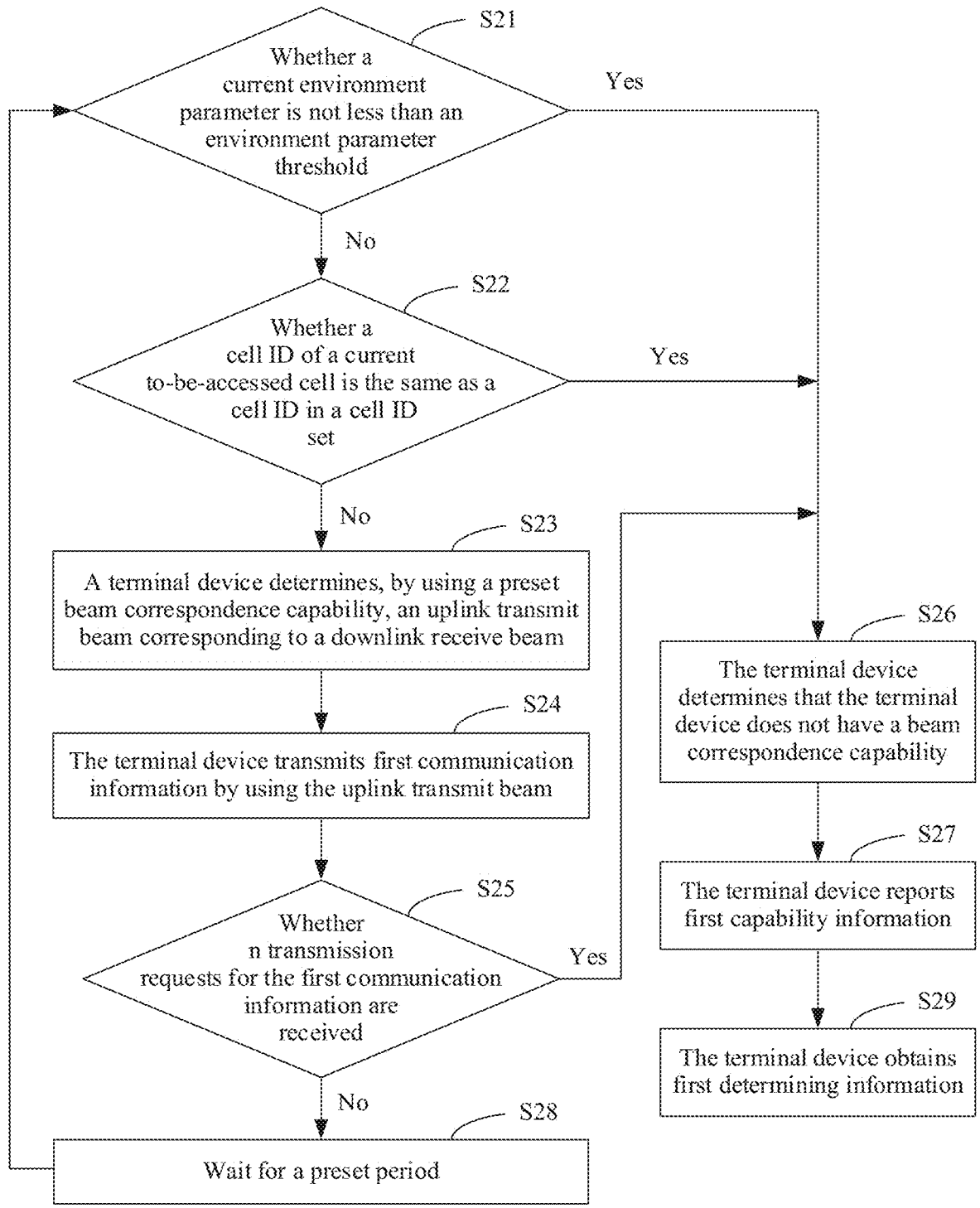
FIG. 11 is a schematic diagram of a working procedure of another beam correspondence capability reporting method according to an embodiment of this application.

In addition, referring to a schematic diagram of a working procedure shown in FIG. 11, after performing the operation in step S26, in other words, after determining that the terminal device does not have the beam correspondence capability, the terminal device may further perform the following operation:

Step S29: The terminal device obtains the first determining information.

After determining that the terminal device does not have the beam correspondence capability, the terminal device may further obtain the first determining information. The first determining information includes an environment parameter threshold and/or a cell ID set.

For a manner in which the terminal device obtains the first determining information, refer to the operations in step S16 and step S17 and the operations in step S18 and step S19. Specifically, after determining, by performing the operation in step S26, that the terminal device does not have the beam correspondence capability, the terminal device obtains at least one environment parameter. When the at least one environment parameter is not less than a first parameter threshold, the terminal device determines the environment parameter threshold based on the at least one environment parameter and a historical environment parameter that is not less than the first parameter threshold. In addition, after determining, by performing the operation in step S26, that the terminal device does not have the beam correspondence capability, the terminal device may further obtain a SINR of the downlink receive beam. When the SINR is greater than a preset second parameter threshold, the terminal device adds the cell ID of the currently accessed cell to the cell ID set.

In addition, in FIG. 11, step S29 is performed after step S27. However, in an actual application process, after step S26, the operation in step S29 may be performed first and then the operation in step S27 is performed. This is not limited in this embodiment of this application.

According to the methods in the foregoing embodiments, the terminal device can detect whether the terminal device has the beam correspondence capability, and proactively report the first capability information when determining that the terminal device does not have the beam correspondence capability. In addition, in an application process, the terminal device may further restore the beam correspondence capability. Therefore, the terminal device may further report second capability information.

Figure 12:
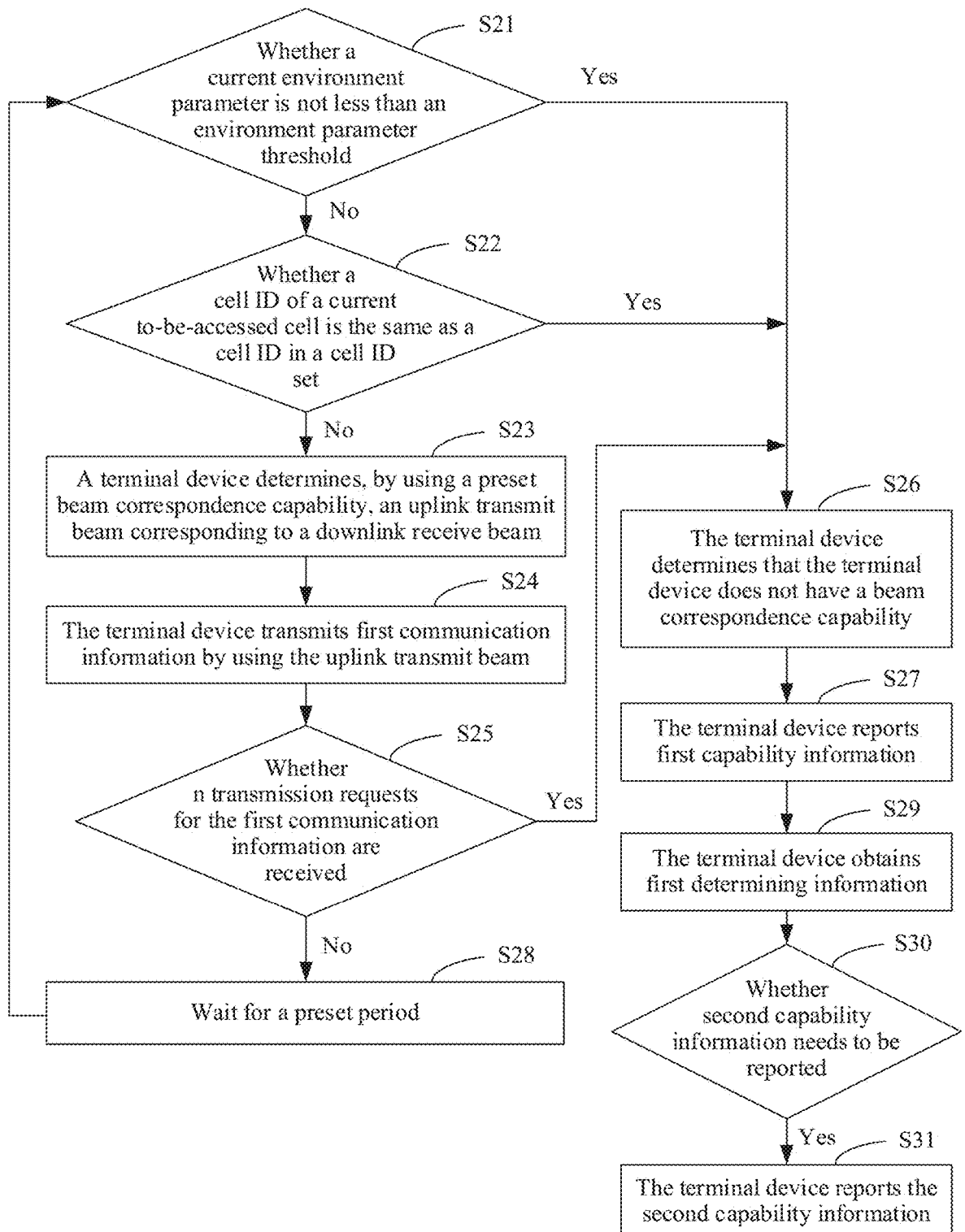
FIG. 12 is a schematic diagram of a working procedure of another beam correspondence capability reporting method according to an embodiment of this application.

In this case, this application further discloses another embodiment. In this embodiment, referring to a schematic diagram of a working procedure shown in FIG. 12, after step S29, the embodiment further includes the following steps.

Step S30: The terminal device determines, based on the first determining information, whether the terminal device needs to report the second capability information, where the second capability information indicates that the terminal device has the beam correspondence capability; and if yes, performs an operation in step S31.

Specifically, in this step, when the current environment parameter is not less than the environment parameter threshold, the terminal device obtains a new environment parameter at an interval of a first period. When the new environment parameter is less than a preset third parameter threshold, the terminal device determines that the terminal device needs to report the second capability information.

The third parameter threshold is a threshold corresponding to an environment parameter in a low-temperature or low-humidity environment. When the environment parameter of the terminal device is less than the third parameter threshold, it indicates that the terminal device is in the low-temperature or low-humidity environment.

If the terminal device is susceptible to an environment and consequently the terminal device does not have the beam correspondence capability, when the terminal device is in an appropriate environment (for example, a low-temperature and low-humidity environment), the terminal device usually restores the beam correspondence capability of the terminal device. For example, when an environment in which the terminal device is located is a high-temperature or high-humidity environment, the terminal device usually does not have the beam correspondence capability, and when the environment in which the terminal device is located changes and a new environment is a low-temperature or low-humidity environment, the beam correspondence capability of the terminal device is usually restored.

In the foregoing embodiment, when the terminal device determines that the environment parameter is less than the third parameter threshold, it indicates that the terminal device is in the low-temperature or low-humidity environment. In this case, the beam correspondence capability of the terminal device is usually restored. Therefore, the terminal device may report the second capability information, so that the base station determines that the terminal device has the beam correspondence capability. Therefore, in a subsequent communication process, the base station communicates with the terminal device based on the beam correspondence capability. This improves communication efficiency.

In addition, when the cell ID of the current to-be-accessed cell is the same as a cell ID in the cell ID set, and when accessing a new cell, the terminal device compares a cell ID of the new to-be-accessed cell with the cell ID set. When the cell ID of the new to-be-accessed cell is different from each cell ID in the cell ID set, the terminal device determines that the terminal device needs to report the second capability information, where the second capability information indicates that the terminal device has the beam correspondence capability.

If the cell ID of the current to-be-accessed cell is the same as a cell ID in the determining information and the cell ID of the new to-be-accessed cell is different from a cell ID in the determining information, it indicates that the terminal device is not interfered with by a neighboring cell after the terminal device accesses the new cell. In this case, the terminal device restores the beam correspondence capability, and therefore can report the second capability information.

Step S31: The terminal device performs detaching, and reports the second capability information in a process of re-accessing a base station.

After the terminal device reports the second capability information, the base station determines, based on the second capability information, that the terminal device has the beam correspondence capability. In a subsequent communication process, the base station communicates with the terminal device based on the beam correspondence capability. This can improve efficiency of communication between the base station and the terminal device.

In other words, when determining that the second capability information needs to be reported, the terminal device performs detaching, then re-accesses the base station, and reports the second capability information in the process of re-accessing a base station.

In addition, after reporting the first capability information, the terminal device needs to perform beam management, and communicates with the base station by using a transmit-receive beam pair determined through beam management. In this case, when the terminal device determines that the second capability information needs to be reported, the terminal device may not perform detaching, but may report the second capability information to the base station by using the transmit-receive beam pair determined through beam management.

The foregoing embodiments disclose an operation that the terminal device proactively reports the first capability information to the base station after the terminal device determines that the terminal device does not have the beam correspondence capability. In addition, after reporting the first capability information, to ensure smooth communication between the terminal device and the base station, the terminal device further needs to perform beam management.

In this case, another embodiment is disclosed. This embodiment of this application further includes:

After reporting the first capability information, the terminal device performs beam management to re-determine a transmit-receive beam pair.

The beam management is used to re-determine a transmit-receive beam pair, and the re-determined transmit-receive beam pair is a beam pair used by the terminal device to align with the base station. After re-determining the transmit-receive beam pair, the terminal device may subsequently communicate with the base station based on the re-determined transmit-receive beam pair. This improves communication efficiency.

The beam management generally includes downlink beam management and uplink beam management. The downlink beam management includes three processes: P-1, P-2, and P-3.

Specifically, the process P-1 is used to implement coarse alignment of downlink beams between the base station and the terminal device. In the process, the base station sequentially transmits information to the terminal device by using different downlink transmit beams, and the terminal device measures the downlink transmit beams by using different downlink receive beams. In the process, both a downlink transmit beam used by the base station and a downlink receive beam used by the terminal device are relatively thick beams, so as to implement the coarse alignment of downlink beams between the base station and the terminal device.

The process P-2 is used to perform fine adjustment on a downlink transmit beam of the base station. In the process, the terminal device measures different downlink transmit beams of the base station by using a same downlink receive beam, where the downlink transmit beams is a narrow beam Therefore, a downlink transmit beam (that is, an optimal downlink transmit beam) with relatively good transmission quality of the base station is determined.

The process P-3 is used to perform fine adjustment on a downlink transmit beam of the terminal device. In the process, the terminal device measures, by using different downlink receive beams, the downlink transmit beam determined by the base station in the process P-2, where the downlink receive beam is a narrow beam. Therefore, a downlink receive beam (that is, an optimal downlink receive beam) with relatively good transmission quality of the terminal device is determined.

Correspondingly, the uplink beam management includes three processes: U-1, U-2, and U-3.

The process U-1 is used to implement coarse alignment of uplink beams between the base station and the terminal device. In the process, the terminal device sequentially transmits information to the base station by using different uplink transmit beams, and the base station measures the uplink transmit beams by using different uplink receive beams. In the process, both an uplink receive beam used by the base station and an uplink transmit beam used by the terminal device are relatively thick beams, so as to implement the coarse alignment of uplink beams between the base station and the terminal device.

The process U-2 is used to perform fine adjustment on an uplink receive beam of the base station. In the process, the base station measures, by using different uplink receive beams, a same uplink transmit beam of the terminal device, where the uplink receive beam is a narrow beam. Therefore, an uplink receive beam (that is, an optimal uplink receive beam) with relatively good transmission quality of the base station is determined.

The process U-3 is used to perform fine adjustment on an uplink transmit beam of the terminal device. In the process, the base station measures different uplink transmit beams of the terminal device by using the uplink receive beam determined in the process U-2, where the uplink transmit beam is a narrow beam. Therefore, an uplink transmit beam (that is, an optimal uplink transmit beam) with relatively good transmission quality of the terminal device is determined.

Through beam management, the terminal device can re-determine a transmit-receive beam pair with relatively good communication quality. This improves subsequent communication quality.

Optionally, this embodiment of this application further includes:

When an optimal downlink receive beam determined by the terminal device through beam management is the same as a first downlink receive beam, and an optimal uplink transmit beam determined through beam management is the same as a first uplink transmit beam, the terminal device performs detaching.

The terminal device reports second capability information in a process of re-accessing a base station, where the second capability information indicates that the terminal device has the beam correspondence capability.

The first downlink receive beam is an optimal downlink receive beam determined by using the beam correspondence capability, and the first uplink transmit beam is an optimal uplink transmit beam determined by using the beam correspondence capability.

When the optimal downlink receive beam determined through beam management is the same as the first downlink receive beam, and the optimal uplink transmit beam determined through beam management is the same as the first uplink transmit beam, it indicates that the transmit-receive beam pair determined by the terminal device by using the preset beam correspondence capability is the same as the transmit-receive beam pair determined through beam management. In this case, it indicates that the terminal device has the beam correspondence capability. Therefore, the terminal device reports the second capability information to the base station, so that the base station determines that the terminal device has the beam correspondence capability. In this way, in a subsequent communication process, the base station and the terminal device still determine a to-be-used transmit-receive beam pair by using the beam correspondence capability, and does not perform beam management. This further improves communication efficiency.

Apparatus embodiments of the present invention are provided below, and may be used to execute the method embodiments of the present invention. For details that are not disclosed in the apparatus embodiments of the present invention, refer to the method embodiments of the present invention.

Figure 13:
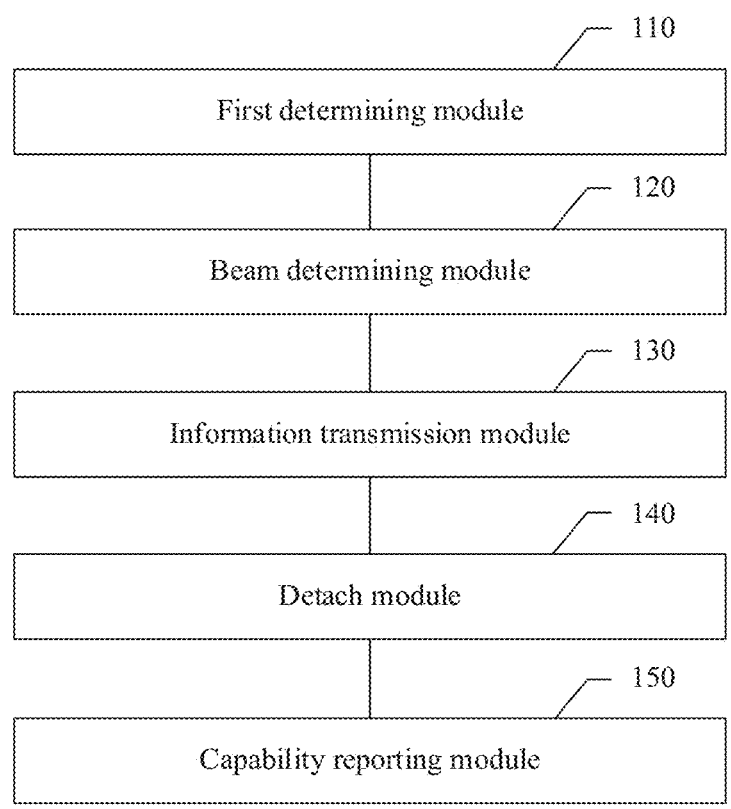
FIG. 13 is a schematic structural diagram of a beam correspondence capability reporting apparatus according to an embodiment of this application.

Correspondingly, another embodiment of this application further discloses a beam correspondence capability reporting apparatus. Referring to a schematic structural diagram shown in FIG. 13, the beam correspondence capability reporting apparatus includes a first determining module 110, a beam determining module 120, an information transmission module 130, a detach module 140, and a capability reporting module 150.

The first determining module 110 is configured to determine, based on pre-obtained first determining information and a first determining condition, whether a terminal device has a beam correspondence capability.

The beam determining module 120 is configured to: when the first determining module determines that the terminal device has the beam correspondence capability, and a beam strength of a downlink receive beam of the terminal device is not less than a preset first strength threshold, determine, by using a preset beam correspondence capability, an uplink transmit beam corresponding to the downlink receive beam.

The beam strength includes reference information received power (reference signal received power, RSRP) and/or reference information received quality (reference signal received quality, RSRQ).

The information transmission module 130 is configured to transmit first communication information by using the uplink transmit beam.

The first communication information may be information that needs to be transmitted to a base station in a process in which the terminal device performs various communication services after the terminal device accesses a cell of the terminal device. For example, when the terminal device accesses a network, the first communication information may be network request information of the terminal device.

The detach module 140 is configured to: when the terminal device receives n transmission requests for the first communication information, perform detaching, where n is a preset positive integer greater than 1.

Herein, n is a positive integer greater than 1, and a specific value of n may be set and adjusted based on a beam correspondence capability reporting requirement of the terminal device. In an example, the specific value of n may be set before delivery. In a subsequent application process, when a requirement for beam correspondence capability detection precision is relatively high, the value of n may be adjusted to a relatively small value; or when a requirement for beam correspondence capability detection precision is relatively low, the value of n may be adjusted to a relatively large value.

The capability reporting module 150 is configured to report first capability information in a process in which the terminal device re-accesses a base station, where the first capability information indicates that the terminal device does not have the beam correspondence capability.

The first determining information may include information in a plurality of forms. For example, the first determining information generally includes an environment parameter threshold and/or a cell ID set. An environment parameter is at least one of a temperature or humidity. The cell ID set includes at least one cell ID. When the terminal device accesses a cell corresponding to the cell ID, the terminal device does not have the beam correspondence capability under the influence of interference from a neighboring cell.

In an optional design, when the first determining information includes the environment parameter threshold, the apparatus disclosed in this embodiment of this application further includes:
 a first parameter obtaining module, configured to: when the terminal device receives the n transmission requests for the first communication information, obtain at least one environment parameter; and
 a threshold determining module, configured to: when the at least one environment parameter is not less than a first parameter threshold, determine the environment parameter threshold based on the at least one environment parameter and a historical environment parameter that is not less than the first parameter threshold.

The environment parameter is the at least one of the temperature or the humidity. When the terminal device receives the n transmission requests for the first communication information, it indicates that the terminal device currently does not have the beam correspondence capability. In this case, each time the terminal device determines that the terminal device does not have the beam correspondence capability, the terminal device may obtain at least one current environment parameter. Then, when the terminal device obtains m environment parameters, and none of the m environment parameters is less than the first parameter threshold, the terminal device determines the environment parameter threshold based on the m environment parameters and the historical environment parameter that is not less than the first parameter threshold, where the environment parameter threshold belongs to the first determining information.

In addition, the apparatus disclosed in this embodiment of this application further includes:
 a SINR obtaining module, configured to: when the terminal device receives the n transmission requests for the first communication information, obtain a signal to interference plus noise ratio SINR of the downlink receive beam; and
 a cell ID adding module, configured to: when the SINR is greater than a preset second parameter threshold, add a cell ID of a currently accessed cell to the cell ID set.

The SINR of the downlink receive beam can reflect whether the downlink receive beam is interfered with. When the SINR is greater than the preset second parameter threshold, it indicates that the terminal device is severely interfered with by a neighboring cell, and the terminal device does not have the beam correspondence capability because of the interference. In this case, the terminal device adds the cell ID of the currently accessed cell to the cell ID set, where the cell ID set may be used as the first determining information.

In this embodiment of this application, when the first determining information includes the environment parameter threshold, the first determining module is specifically configured to: if a current environment parameter is not less than the environment parameter threshold, determine that the terminal device does not have the beam correspondence capability.

In addition, when the first determining information is the cell ID set, the first determining module is specifically configured to: when a cell ID of a cell currently to be accessed by the terminal device is the same as a cell ID included in the cell ID set, determine that the terminal device does not have the beam correspondence capability.

In an application process, the terminal device may further restore the beam correspondence capability of the terminal device. In this case, the apparatus disclosed in this embodiment of this application further includes:
 a second parameter obtaining module, configured to: when the current environment parameter is not less than the environment parameter threshold, obtain a new environment parameter at an interval of a first period.

The detach module is further configured to: when the new environment parameter is less than a preset third parameter threshold, perform detaching.

The capability reporting module is further configured to report second capability information in a process in which the terminal device re-accesses a base station, where the second capability information indicates that the terminal device has the beam correspondence capability.

When the new environment parameter is less than the preset third parameter threshold, it indicates that an environment in which the terminal device is located changes to an environment of a low temperature and low humidity. In this case, the terminal device determines that the terminal device restores the beam correspondence capability, and proactively reports the second capability information.

The apparatus disclosed in this embodiment of this application further includes:
 a cell ID comparison module, configured to: when the cell ID of the current to-be-accessed cell is the same as a cell ID in the cell ID set, and when the terminal device accesses a new cell, compare a cell ID of the new to-be-accessed cell with the cell ID set.

The detach module is further configured to: when the cell ID of the new to-be-accessed cell is different from each cell ID in the cell ID set, perform detaching.

The capability reporting module is further configured to report second capability information in a process in which the terminal device re-accesses a base station, where the second capability information indicates that the terminal device has the beam correspondence capability.

When the cell ID of the new to-be-accessed cell is different from each cell ID in the cell ID set, it indicates that the terminal device does not access a cell severely interfered with by a neighboring cell. In this case, the terminal device determines that the terminal device restores the beam correspondence capability, and proactively reports the second capability information.

When the terminal device does not have the beam correspondence capability, to ensure efficiency of communication between the terminal device and the base station, the apparatus disclosed in this embodiment of this application further includes:
 a beam management module, configured to: after the terminal device reports the first capability information, perform beam management to re-determine a transmit-receive beam pair.

The beam management is used to re-determine a transmit-receive beam pair, and the re-determined transmit-receive beam pair is a beam pair used by the terminal device to align with the base station. After re-determining the transmit-receive beam pair, the terminal device may subsequently communicate with the base station based on the re-determined transmit-receive beam pair. This improves communication efficiency.

In the apparatus disclosed in this embodiment of this application, the detach module is further configured to: when an optimal downlink receive beam determined through beam management is the same as a first downlink receive beam, and an optimal uplink transmit beam determined through beam management is the same as a first uplink transmit beam, perform detaching, where the first downlink receive beam is an optimal downlink receive beam determined by using the beam correspondence capability, and the first uplink transmit beam is an optimal uplink transmit beam determined by using the beam correspondence capability.

The capability reporting module is further configured to report second capability information in a process of re-accessing a base station, where the second capability information indicates that the terminal device has the beam correspondence capability.

When the optimal downlink receive beam determined through beam management is the same as the first downlink receive beam, and the optimal uplink transmit beam determined through beam management is the same as the first uplink transmit beam, it indicates that the transmit-receive beam pair determined by the terminal device by using the preset beam correspondence capability is the same as the transmit-receive beam pair determined through beam management. In this case, it indicates that the terminal device has the beam correspondence capability. Therefore, the terminal device reports the second capability information to the base station, so that the base station determines that the terminal device has the beam correspondence capability. In this way, in a subsequent communication process, the base station and the terminal device still determine a to-be-used transmit-receive beam pair by using the beam correspondence capability, and does not perform beam management. This further improves communication efficiency.

According to the beam correspondence capability reporting apparatus disclosed in the embodiments of this application, the beam correspondence capability of the terminal device may be measured, and reporting is performed when it is determined that the terminal device does not have the beam correspondence capability. This avoids a case in which communication efficiency is reduced because the terminal device still transmits information by using an inappropriate transmit-receive beam pair when the terminal device does not have the beam correspondence capability.

Further, in this embodiment of this application, the terminal device may determine, based on whether two factors, namely, the first determining information and the first communication information, are successfully sent, whether the terminal device has the beam correspondence capability, so that the terminal device can accurately determine whether the terminal device has the beam correspondence capability.

In addition, in this embodiment of this application, when the terminal device determines, by using the first determining information, that the terminal device does not have the beam correspondence capability, the terminal device directly performs detaching, and reports the first capability information in the process of re-accessing the base station. In other words, in this embodiment of this application, the terminal device first determines, by using the determining information, whether the terminal device has the beam correspondence capability, and when determining that the terminal device does not have the beam correspondence capability, directly reports the first capability information and does not need to determine, based on whether the first communication information is successfully sent, whether the terminal device has the beam correspondence capability. This saves power consumption generated when the terminal device sends the first communication information. Moreover, when determining, based on whether the first communication information is successfully sent, whether the terminal device has the beam correspondence capability, the terminal device usually needs to send the first communication information for a plurality of times. This is relatively time-consuming. Therefore, a manner of preferably determining, by using the first determining information, whether the terminal device has the beam correspondence capability can also improve efficiency of determining, by the terminal device, whether the terminal device has the beam correspondence capability.

Figure 14:
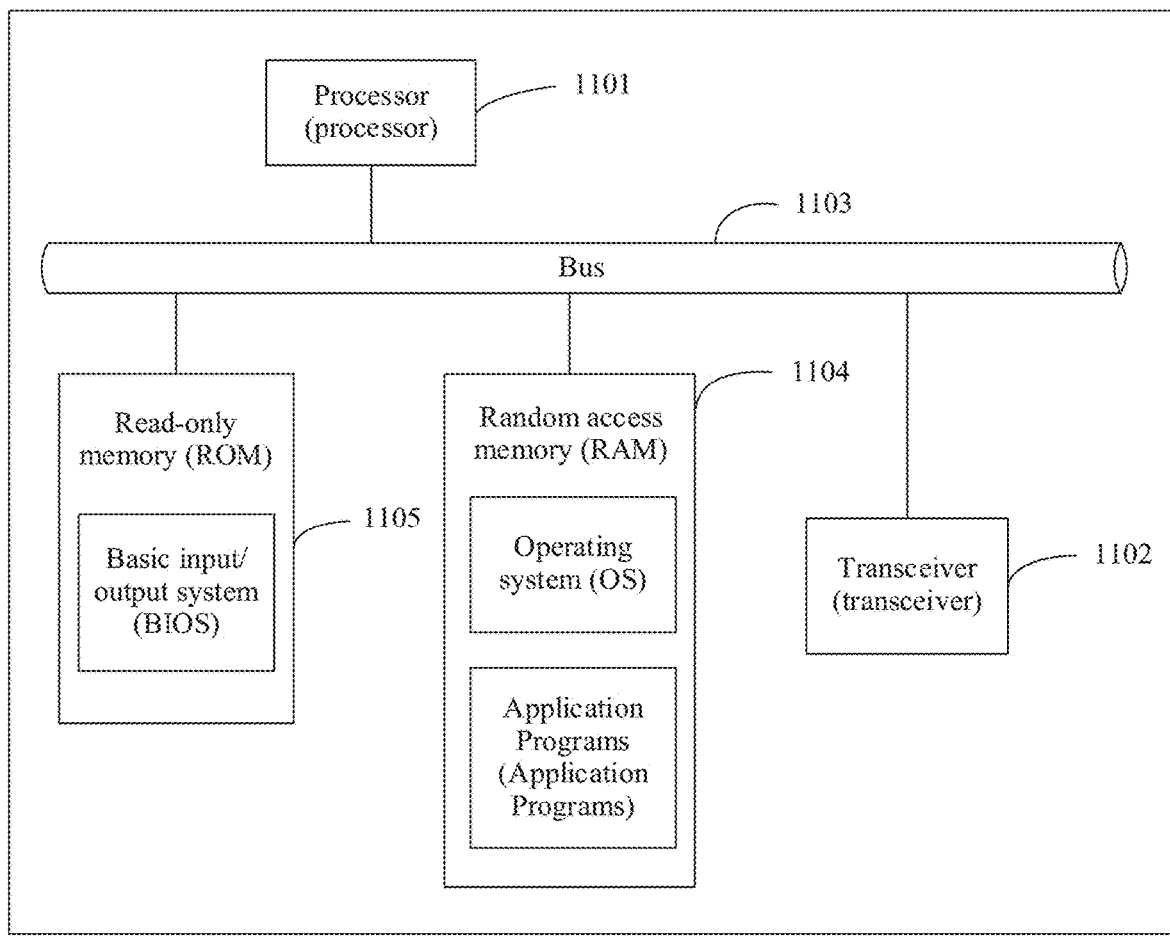
FIG. 14 is a schematic structural diagram of a terminal device according to an embodiment of this application.

Correspondingly, an embodiment of this application discloses a beam correspondence capability reporting apparatus. Referring to a schematic structural diagram shown in FIG. 14, the terminal device includes:

a processor 1101 and a memory.

The memory is configured to store program instructions.

The processor 1101 is configured to invoke and execute the program instructions stored in the memory, so that the beam correspondence capability reporting apparatus performs all or some of the steps in the embodiments corresponding to FIG. 6 and FIG. 8 to FIG. 12.

The terminal apparatus may further include a transceiver 1102 and a bus 1103, and the memory includes a random access memory 1104 and a read-only memory 1105.

The processor is separately coupled to the transceiver, the random access memory, and the read-only memory through the bus. When the terminal apparatus needs to run, starting is performed by using a basic input/output system built in the read-only memory or by using a bootloader (bootloader) system in an embedded system, to boot the terminal apparatus to enter a normal running state. After entering the normal running state, the terminal apparatus runs an application program and an operating system in the random access memory, so that the terminal apparatus performs all or some of the steps in the embodiments corresponding to FIG. 6 and FIG. 8 to FIG. 12.

The communications device in this embodiment of the present invention may correspond the terminal apparatus in the embodiments corresponding to FIG. 6 and FIG. 8 to FIG. 12. In addition, the processor, the transceiver, and the like in the terminal apparatus may implement functions of the terminal apparatus and/or various steps and methods implemented by the terminal apparatus in the embodiments corresponding to FIG. 6 and FIG. 8 to FIG. 12. For brevity, details are not described herein again.

It should be noted that, in this embodiment, the terminal apparatus may also be implemented based on a general-purpose physical server in combination with a network function virtualization (English: Network Function Virtualization, NFV) technology, and the terminal apparatus is a virtual terminal apparatus (for example, a virtual host, a virtual router, or a virtual switch). The virtual terminal apparatus may be a virtual machine (English: Virtual Machine, VM) that runs a program used to send an advertisement packet, and the virtual machine is deployed on a hardware device (for example, a physical server). The virtual machine is a complete software-simulated computer system that has complete hardware system functions and runs in an entirely isolated environment. A person skilled in the art can virtualize a plurality of communications devices having the foregoing functions on a general-purpose physical server by reading this application. Details are not described herein again.

The beam correspondence capability reporting apparatus disclosed in this embodiment of this application may be an apparatus in a plurality of forms. In a feasible implementation, the beam correspondence capability reporting apparatus is a chip. A memory in the chip stores program instructions, and a processor in the chip implements beam correspondence capability reporting by invoking the program instructions stored in the memory.

In another feasible implementation, the beam correspondence capability reporting apparatus is a terminal device, for example, may be a mobile phone, or a vehicle-mounted device or an intelligent wearable device having a communication function. This is not limited in this embodiment of this application.

During specific implementation, an embodiment of this application further provides a computer-readable storage medium. The computer-readable storage medium stores instructions, and when the instructions are run on a computer, the computer may be enabled to implement all or some of the steps in the embodiments corresponding to FIG. 6 and FIG. 8 to FIG. 12. The computer-readable storage medium is disposed in any device. The any device may be a random access memory (random access memory, RAM), or the memory may include a nonvolatile memory (nonvolatile memory), for example, a read-only memory (read-only memory, ROM), a flash memory (flash memory), a hard disk drive (hard disk drive, HDD), or a solid-state drive (solid-state drive, SSD), or the memory may include a combination of the foregoing types of memories, or the like.

A person skilled in the art may further understand that various illustrative logical blocks (illustrative logical block) and steps (step) that are listed in the embodiments of this application may be implemented by using electronic hardware, computer software, or a combination thereof. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of this application.

The various illustrative logical units and circuits described in the embodiments of this application may implement or operate the described functions by using a general-purpose processor, a digital information processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital information processor and a microprocessor, a plurality of microprocessors, one or more microprocessors in combination with one digital information processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor can read information from the storage medium and write information into the storage medium optionally, the storage medium may alternatively be integrated into the processor. The processor and the storage medium may be disposed in an ASIC, and the ASIC may be disposed in UE. Optionally, the processor and the storage medium may be disposed in different components of the UE.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

The embodiments in this specification are all described in a progressive manner. For same or similar parts in the embodiments, refer to these embodiments. Each embodiment focuses on a difference from other embodiments. Especially, apparatus and system embodiments are basically similar to a method embodiment, and therefore are described briefly. For related parts, refer to partial descriptions in the method embodiment.

Although some preferred embodiments of this application have been described, a person skilled in the art can make changes and modifications to these embodiments once learning of the basic inventive concept. Therefore, the following claims are intended to be construed as to cover the preferred embodiments and all changes and modifications falling within the scope of this application.

A person skilled in the art may clearly understand that the technologies in the embodiments of the present invention may be implemented by software in addition to a necessary general hardware platform. Based on such an understanding, the technical solutions in the embodiments of the present invention essentially, or the part contributing to the conventional technology may be implemented in a form of a software product. The computer software product may be stored in a storage medium, such as a ROM/RAM, a magnetic disk, or an optical disc, and includes several instructions for indicating a computer device (which may be a personal computer, a server, a network device, or the like) to perform the methods described in the embodiments or some parts of the embodiments of the present invention.

For same or similar parts in the embodiments in this specification, refer to each other. Especially, the . . . embodiment is basically similar to the method embodiment, and therefore is described briefly. For related parts, refer to descriptions in the method embodiment.

The foregoing implementations of the present invention do not constitute any limitation on the protection scope of the present invention.

What is claimed is:

1. A method implemented by a terminal device, wherein the method comprises:
    determining, based on first determining information and a first determining condition, whether the terminal device has a beam correspondence capability;
    determining, using a preset beam correspondence capability, an uplink transmit beam corresponding to a downlink receive beam of the terminal device when the terminal device has the beam correspondence capability and when a beam strength of the downlink receive beam is not less than a preset first strength threshold;
    transmitting first communication information using the uplink transmit beam;
    receiving n transmission requests for the first communication information, wherein n is a preset positive integer greater than one;
    performing, in response to receiving the n transmission requests, detaching; and
    reporting, in a first process of re-accessing a first base station, first capability information indicating that the terminal device does not have the beam correspondence capability.

2. The method of claim 1, wherein the first determining information comprises a cell identifier (ID), or a cell ID set, or an environment parameter threshold, and wherein an environment parameter comprises at least one of a temperature or a humidity.

3. The method of claim 2, wherein the first determining information comprises the environment parameter threshold, and wherein the method further comprises:
    obtaining the environment parameter when receiving the n transmission requests; and
    determining the environment parameter threshold based on the environment parameter and a historical environment parameter that is not less than a first parameter threshold when the environment parameter is not less than the first parameter threshold.

4. The method of claim 2, further comprising:
    when the terminal device receives the n transmission requests for the first communication obtaining a signal-to-interference-plus-noise ratio (SINK) of the downlink receive beam when receiving the n transmission requests; and
    adding a cell ID of a currently accessed cell to the cell ID set when the SINR is greater than a preset second parameter threshold.

5. The method of claim 2, wherein the first determining information comprises the environment parameter threshold, and wherein the method further comprises:
    identifying that a current environment parameter is not less than the environment parameter threshold; and
    determining, in response to identifying that the current environment parameter is not less than the environment parameter threshold, that the terminal device does not have the beam correspondence capability.

6. The method of claim 2, wherein the first determining information comprises the cell ID set, and wherein the method further comprises:
    identifying that a first cell ID of a cell to be accessed by the terminal device is in the cell ID set; and
    determining, in response to identifying that the first cell ID is in the cell ID set, that the terminal device does not have the beam correspondence capability.

7. The method of claim 5, further comprising:
    obtaining a new environment parameter at an interval of a first period when the current environment parameter is not less than the environment parameter threshold;
    performing detaching when the new environment parameter is less than a preset third parameter threshold; and
    reporting, in a second process of re-accessing a second base station, second capability information indicating that the terminal device has the beam correspondence capability.

8. The method of claim 6, further comprising:
    accessing a new cell that comprises a second cell ID;
    comparing the second cell ID with the cell ID set when the first cell ID is in the cell ID set and in response to accessing the new cell;
    performing detaching when the second cell ID is different from each cell ID in the cell ID set; and
    reporting, in a second process of re-accessing a second base station, second capability information indicating that the terminal device has the beam correspondence capability.

9. The method of claim 1, wherein after reporting the first capability information, the method further comprises performing beam management to re-determine a transmit-receive beam pair.

10. The method of claim 9, further comprising:
    making a first determination, through beam management, that an optimal downlink receive beam is the same as a first downlink receive beam, wherein the first downlink receive beam is based on the beam correspondence capability;
    making a second determination, through the beam management, that an optimal uplink transmit beam is the same as a first uplink transmit beam, wherein the first uplink transmit beam is based on the beam correspondence capability;
    performing, in response to the first determination and the second determination, detaching; and
    reporting, in a second process of re-accessing a second base station, second capability information indicating that the terminal device has the beam correspondence capability.

11. An apparatus comprising:
    a memory configured to store program instructions; and
    a processor coupled to the memory and configured to invoke the program instructions to cause the apparatus:
        determine, based on first determining information and a first determining condition, whether the apparatus has a beam correspondence capability;

determine, using a preset beam correspondence capability, an uplink transmit beam corresponding to a downlink receive beam of the apparatus when the apparatus has the beam correspondence capability and a beam strength of the downlink receive beam is not less than a preset first strength threshold;

transmit first communication information using the uplink transmit beam;

receive n transmission requests for the first communication information, wherein n is a preset positive integer greater than one;

perform, in response to receiving the n transmission requests, detaching; and report, in a first process of re-accessing a first base station, first capability information indicating that the apparatus does not have the beam correspondence capability.

12. The apparatus of claim 11, wherein the apparatus is a chip.

13. A computer program product comprising computer-executable instructions that are stored on a non-transitory computer-readable storage medium and that, executed by a processor, cause an apparatus to:

determine, based on first determining information and a first determining condition, whether the apparatus has a beam correspondence capability;

determine, using a preset beam correspondence capability, an uplink transmit beam corresponding to a downlink receive beam of the apparatus when the apparatus has the beam correspondence capability and a beam strength of the downlink receive beam is not less than a preset first strength threshold;

transmit first communication information using the uplink transmit beam;

receive n transmission requests for the first communication information, wherein n is a preset positive integer greater than one;

perform, in response to receiving the n transmission requests, detaching; and report, in a first process of re-accessing a first base station, first capability information indicating that the apparatus does not have the beam correspondence capability.

14. The apparatus of claim 11, wherein the first determining information comprises a cell identifier (ID), or a cell ID set, or an environment parameter threshold, and wherein an environment parameter comprises at least one of a temperature or a humidity.

15. The apparatus of claim 14, wherein the first determining information comprises the environment parameter threshold, and wherein, when executed by the processor, the program instructions cause the apparatus to:

obtain the environment parameter when receiving the n transmission requests; and determine the environment parameter threshold based on the environment parameter and a historical environment parameter that is not less than a first parameter threshold when the environment parameter is not less than the first parameter threshold.

16. The apparatus of claim 14, wherein, when executed by the processor, the program instructions further cause the apparatus to:

obtain a signal to interference plus noise ratio (SINR) of the downlink receive beam when receiving the n transmission requests; and add a cell ID of a currently accessed cell to the cell ID set when the SINR is greater than a preset second parameter threshold.

17. The apparatus of claim 16, wherein, when executed by the processor, the program instructions further cause the apparatus to:

obtain a new environment parameter at an interval of a first period when a current environment parameter is not less than the environment parameter threshold;

perform detaching when the new environment parameter is less than a preset third parameter threshold; and report, in a second process of re-accessing a second base station, second capability information indicating that the apparatus has the beam correspondence capability.

18. The apparatus of claim 14, wherein the first determining information comprises the environment parameter threshold, wherein, when executed by the processor, the program instructions further cause the apparatus to:

identify that a current environment parameter is not less than the environment parameter threshold; and determine, in response to identifying that the current environment parameter is not less than the environment parameter threshold, that the apparatus does not have the beam correspondence capability.

19. The apparatus of claim 18, wherein, when executed by the processor, the program instructions further cause the apparatus to:

accesses a new cell comprising a first cell ID;

compare the first cell ID with the cell ID set when a second cell ID of a cell to be accessed by the apparatus is in the cell ID set and when accessing the new cell;

perform detaching when the first cell ID is different from each cell ID in the cell ID set; and report, in a second process of re-accessing a second base station, second capability information indicating that the apparatus has the beam correspondence capability.

20. The apparatus of claim 14, wherein the first determining information comprises the cell ID set, wherein, when executed by the processor, the program instructions further cause the apparatus to:

identify that a cell ID of a cell to be accessed by the apparatus is in the cell ID set; and determine, in response to identifying that the cell ID is in the cell ID set, that the apparatus does not have the beam correspondence capability.

* * * * *

UNITED STATES PATENT AND TRADEMARK OFFICE
CERTIFICATE OF CORRECTION

PATENT NO. : 12,028,845 B2
APPLICATION NO. : 17/605816
DATED : July 2, 2024
INVENTOR(S) : Cen Ling It is certified that error appears in the above-identified patent and that said Letters Patent is hereby corrected as shown below:

In the Claims

Claim 4, Column 39, Lines 60-61: "when the terminal device receives the n transmission requests for the first communication obtaining a" should read "obtaining a"

Claim 4, Column 39, Line 62: "ratio (SINK)" should read "ratio (SINR)"

Claim 13, Column 41, Line 22: "and that, executed by" should read "and that, when executed by"

Signed and Sealed this
Sixth Day of August, 2024

Katherine Kelly Vidal
*Director of the United States Patent and Trademark Office*